(12) United States Patent
Matsui

(10) Patent No.: US 7,123,552 B2
(45) Date of Patent: Oct. 17, 2006

(54) WOBBLE SIGNAL DETECTING CIRCUIT FOR OPTICAL DISC SYSTEM

(75) Inventor: Masakatsu Matsui, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 423 days.

(21) Appl. No.: 10/253,966
(22) Filed: Sep. 25, 2002

(65) Prior Publication Data

US 2003/0072231 A1     Apr. 17, 2003

(30) Foreign Application Priority Data

Sep. 26, 2001    (JP)    ............................. 2001-294598

(51) Int. Cl.
*G11B 7/00*     (2006.01)
(52) U.S. Cl. ............................. 369/44.13; 369/124.07; 369/44.34
(58) Field of Classification Search ............. 369/47.22, 369/47.4, 47.17, 47.28, 44.13, 44.26, 44.27, 369/53.26, 53.29, 53.37, 53.31, 59.1, 59.2, 369/44.34, 44.36, 44.41, 53.19, 53.22, 124.12, 369/53.34, 44.25, 47.1, 47.48, 59.15

See application file for complete search history.

(56) References Cited

U.S. PATENT DOCUMENTS

| | | | | |
|---|---|---|---|---|
| 4,901,300 A | * | 2/1990 | Van Der Zande et al. | ............... 369/47.4 |
| 5,650,987 A | * | 7/1997 | Kadowaki | ................ 369/44.34 |
| 6,081,490 A | * | 6/2000 | Kuroda et al. | ............ 369/47.28 |
| 6,345,018 B1 | * | 2/2002 | Maegawa et al. | ........ 369/44.13 |
| 6,418,105 B1 | * | 7/2002 | Horino et al. | ........... 369/53.37 |
| 6,556,523 B1 | * | 4/2003 | Masui | ..................... 369/47.28 |
| 6,621,772 B1 | * | 9/2003 | Asano et al. | ............. 369/44.26 |
| 6,643,239 B1 | * | 11/2003 | Nakajo | .................... 369/53.26 |
| 6,687,204 B1 | * | 2/2004 | Miyanabe et al. | ....... 369/47.17 |

FOREIGN PATENT DOCUMENTS

JP     2001-093147     6/2001

* cited by examiner

*Primary Examiner*—Thang V. Tran
*Assistant Examiner*—Kim-Kwok Chu
(74) *Attorney, Agent, or Firm*—Dickstein ShapiroLLP

(57) ABSTRACT

A wobble signal detecting circuit for optical disc system includes at least a sample-and-hold circuit for carrying out sample-holding steps on each of first and second photoelectric signals, and a high range frequency limiting circuit for removing frequency components equal to, or higher than, a predetermined cut-off frequency from the first and second photoelectric signals. By selectively enabling either the sample-and-hold circuit or high range frequency limiting circuit, depending on recording conditions during the period of recording information into an optical information recording medium, noise components which may unduly affect wobble signals can be removed efficiently, irrespective of recording conditions.

18 Claims, 12 Drawing Sheets

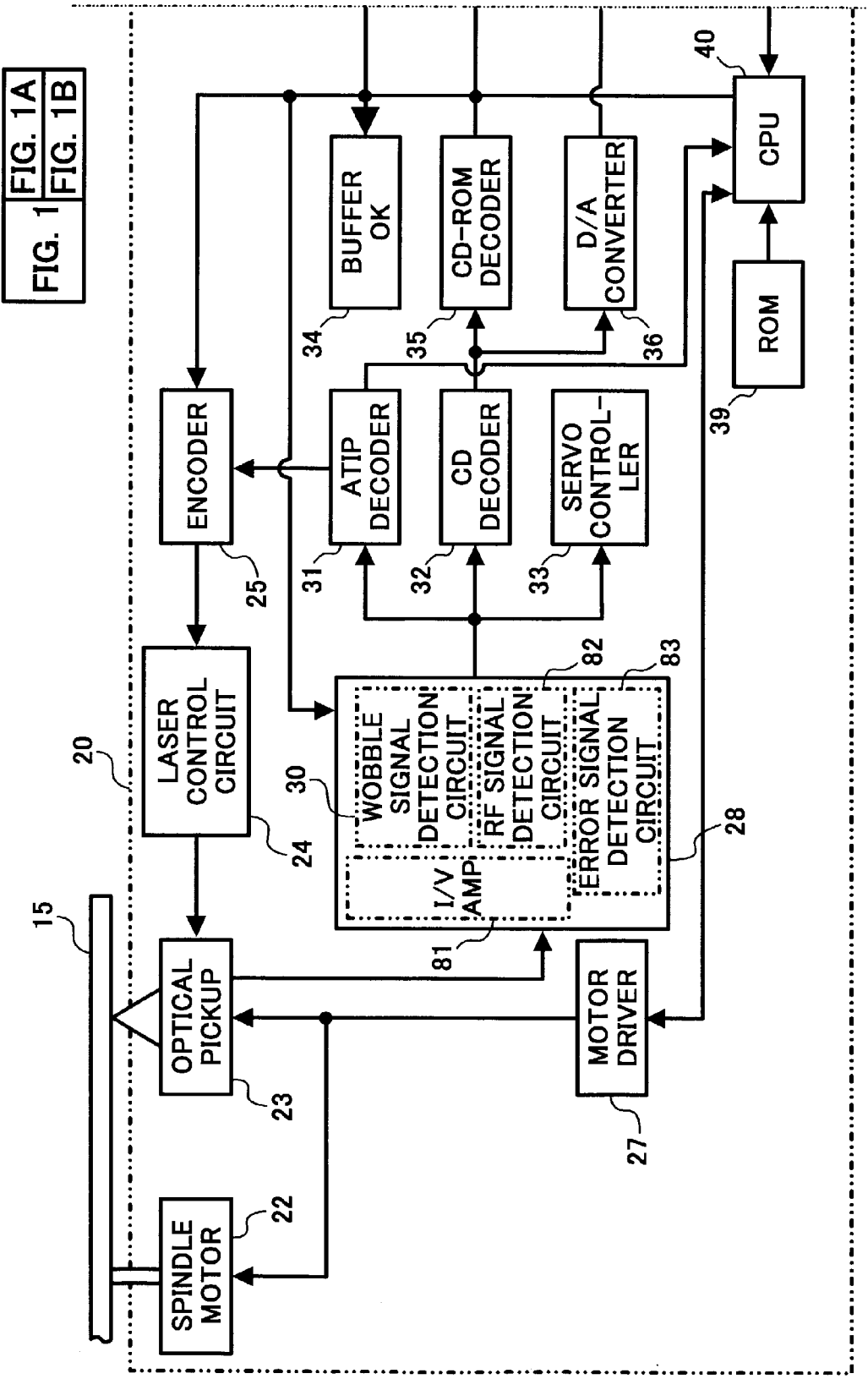

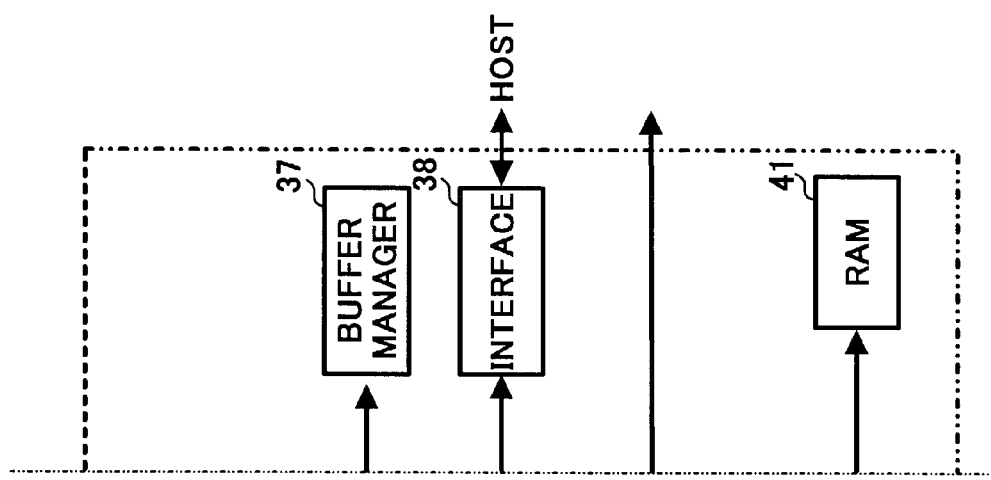

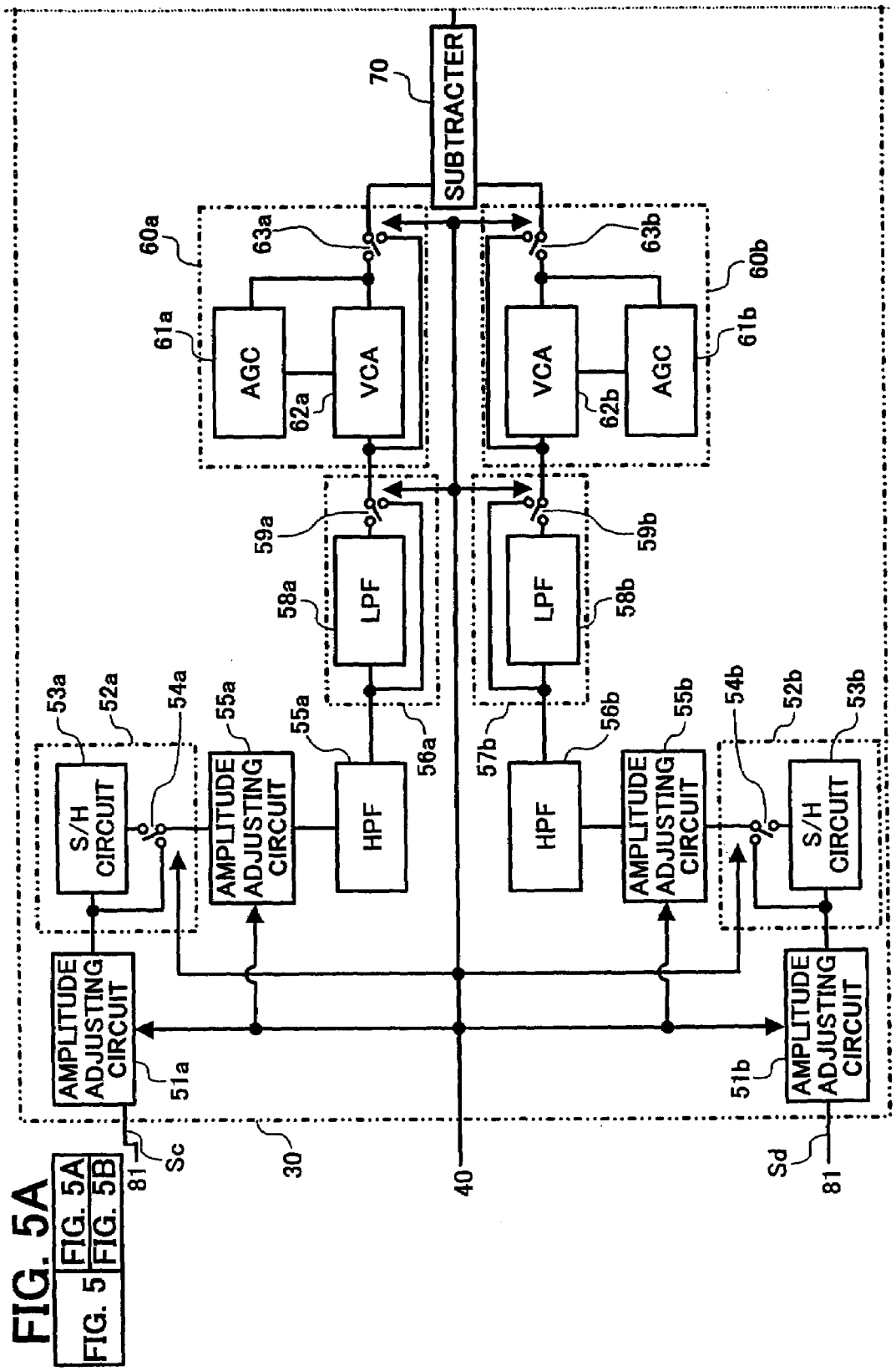

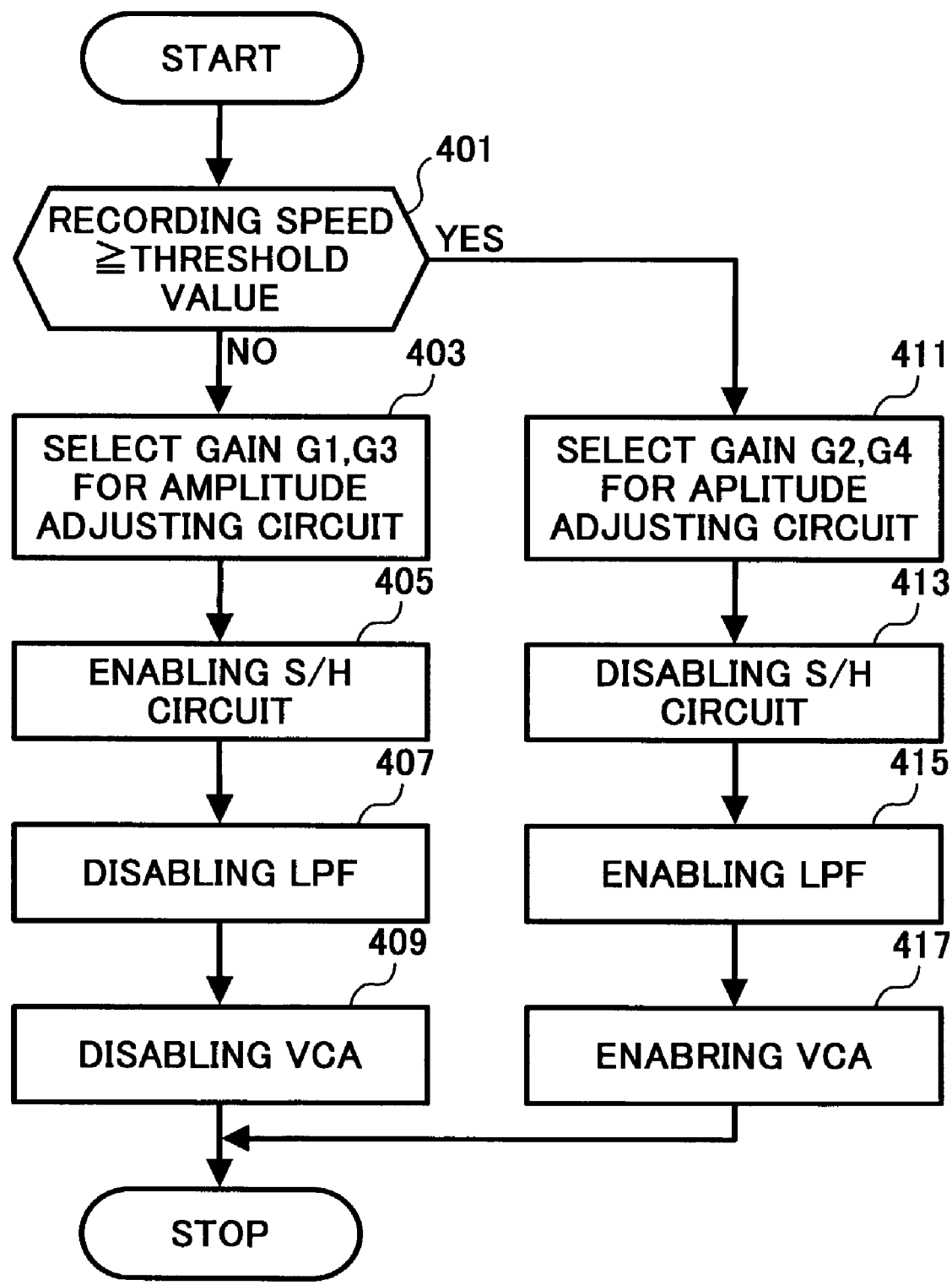

WOBBLE SIGNAL DETECTING CIRCUIT FOR OPTICAL DISC SYSTEM

BACKGROUND

1. Field

This patent specification relates to a wobble signal detecting circuit in use primarily for optically recording and reading out, and more particularly, to such circuits capable of effectively detecting wobble signals prerecorded in an optical recording medium and being suitably incorporated into an optical information record and readout system.

2. Discussion of the Background

Optical information record/readout systems (or optical disc systems) have come into practical use for viable information data storage and archival device of large capacity, which are configured to record information into recording regions formed continuously in the shape of spiral on an optical recording medium and read out recorded information from the medium with laser beams emanated from an optical pickup device.

With recent improvements in overall capabilities, it has become feasible of a personal computer to process AV (audio-visual) information such as music sounds and movie images, for example. Since the data volume of AV information is considerably large, optical recording media has been attracting much attention as viable means for storing such information data, and optical disc systems with lowering costs have been in wide spread use as one of peripherals of personal computers.

As described earlier, for rewritable recording media such as CD-R (CD-Recordable) and CD-RW (CD-Rewritable), a plurality of recording regions are formed in general with tracks (or pregrooves) formed continuously on an optical recording medium. In addition, by meandering (or wobbling) the tracks, additional pieces of information pertinent to driving the recording media is recorded as wobbling signals.

Of particular importance among the pieces of information is ATIP (Absolute Time in Pregroove) information. This information includes time information designating absolute address on recording medium (absolute time information) for properly controlling the location of the optical pickup during recording and reading out process steps. In addition, the ATIP information also includes signals for synchronizing overall operation with the velocity of disc rotation.

If correct ATIP information is not obtained, therefore, the control of optical pickup to bring to a proper programmed location can not be achieved, nor the necessary synchronization of the overall operation with disc rotation, which may give rise to recording errors.

These errors have serious effects particularly on the CD-R disc currently used, in which the disc has to be prohibited from a further use if one recording error is once detected.

Therefore, it is of considerable importance to obtain correct ATIP information during recording and reading out process steps. This becomes feasible by detecting wobble signals with a high accuracy.

The wobble signals have been detected previously by receiving light beams reflected from recording tracks with a photoreceptive device doubly split (or doubly-split photoreceptor) in the tangential direction with respect to the recording track regions, obtaining tracking error signals based on photoelectric signals (output signals) from respective portions of the doubly-split photoreceptive device, and extracting predetermined frequency components from the tracking error signals.

The signals obtained from reflected light beams, however, have to be examined closely because of the effect from the beam intensity as described herein below.

That is, the power emanated from a semiconductor laser in optical pickup is increased during recording into an optical disc. During the periods in-between recordings (i.e., space time without recording), in contrast, the power is decreased to the approximately same level of magnitude as that for readout periods. As a result, the power of laser emission varies in a pulse-shaped manner with time. The photoelectric signals output from photoreceptive device, however, do not exhibit the same pulse shape.

For example, in the case of approximately quad-nominal (CD 4×) speed, the intensity of photoelectric signals output from photoreceptive device exhibits a peak almost immediately after the increase in laser power (i.e., after showing leading increase with time) during recording, then decreases gradually with the formation of recorded marks, that is followed by flat portions which appears partially during the period corresponding to decreased laser power.

The change in photoelectric signal intensity, therefore, has a waveform different from that of the laser emission for the following reason: Chemical and other similar changes take place at the disc portions irradiated with laser beams following the formation of recorded marks, thereby giving rise to reflectivity change of corresponding track portions.

Because of such a rather complex change exhibited by signal intensity of reflected light, it has been often difficult to detect wobble signals from tracking error signals with a high accuracy.

In order to obviate the above noted difficulty, several detecting circuits have been disclosed for accurately detecting wobble signals during information recording into optical discs. One example of such circuit is Japanese Laid-Open Patent Application No. 2001-93147.

According to this reference, a wobble signal detecting circuit includes an optical detecting means for optically detecting a pair of portions (left- and right-hand sides) which are formed by splitting a light beam spot and aligned in the tangential direction with respect to the recording tracks, sample-holding means for carrying out sample-and-hold steps with respect to signals output from respective left- and right-hand sides of the beam spot, low range frequency filtering means for filtering noise components which are caused by filtering and included in respective signals output from left- and right-hand sides portions, and subtracting means for computing the difference between respective signals output from the low range frequency filtering means, whereby wobble signals are obtained.

In addition, the above noted sample-holding steps are carried out with respect to the aforementioned flat portions, which appears partially during the period corresponding to decreased laser power, in the intensity versus time curve of photoelectric signals.

With the wobble signal detecting circuit according to that disclosure, it appears feasible to detect wobble signals accurately in the case of relatively low recording velocity, since the flat regions in the intensity versus time curve of photoelectric signals are relatively stable for respective output signals from left- and right-hand side portions.

In the case of relatively high recording velocity, in contrast, the intensity versus time curve of photoelectric signals becomes more complicated for respective output signals, and the flat regions become less stable. As a result, output photoelectric signals include more complex noise components which can not be removed completely. This gives rise to a drawback, in which errors may be included in detected wobble signals.

Since time interval for carrying out sample-holding steps becomes shorter with increasing recording velocity, the sample-holding means is required to function stably and accurately at high recording velocities. This tends to hamper miniaturization and reducing costs of the wobble signal detecting circuit, to thereby give rise to another drawback.

In addition, with further increase in recording capacity of optical recording media in future, concomitant increase in recording velocity can be much anticipated which necessitates improvements in high frequency capabilities of the wobble signal detecting circuit.

SUMMARY

Accordingly, it is an object of the present disclosure to provide a wobble signal detecting circuit, having most, if not all, of the advantages and features of similar employed circuits, while eliminating many of the aforementioned disadvantages.

It is another object of the present disclosure to provide a wobble signal detecting circuit capable of detecting wobble signals with a high accuracy and at lower costs irrespective of recording velocity.

It is still another object to provide an optical information record/readout system incorporating a wobble signal detecting circuit disclosed herein, continually feasible of highly reliable information recording into an optical recording medium with a high accuracy through the range of higher recording velocities.

The following brief description is a synopsis of only selected features and attributes of the present disclosure. A more complete description thereof is found below in the section entitled "Description of the Preferred Embodiments"

A wobble signal detecting circuit disclosed herein is configured to detect wobble signals by receiving light beams reflected from a plurality of recording regions formed continuously on an optical information recording medium in the shape of spiral or concentric circle, and by detecting wobble signal marks previously formed in the plurality of recording regions by means of first and second photo-receiving regions of a photoreceptor, formed by splitting at least doubly in tangential direction with respect to the plurality of recording regions, based on a first photoelectric signal from the first photo-receiving region and a second photoelectric signal from the second photo-receiving region.

The wobble signal detecting circuit includes at least a sample-and-hold circuit for implementing sample-holding steps on each of the first and second photoelectric signals, a high range frequency limiting circuit for removing frequency components equal to, or higher than, a predetermined cut-off frequency from the first and second photoelectric signals, in which the sample-and-hold circuit and high range frequency limiting circuit are each selectively enabled depending on recording conditions during the period of recording information into the optical information recording medium.

Incidentally, the optical information recording medium related to the present disclosure includes every information recording media, for which affixed information data are recorded as wobble signals, inclusive of optical recording medium such as CD-R and CD-RW, for example.

The wobble signal detecting circuit disclosed herein, therefore, operates either the sample-and-hold circuit or high range frequency limiting circuit enabled depending on recording conditions during recording steps.

In case when the sample-and-hold circuit is enabled, noise components which are not related to the wobble signal can be removed with a high accuracy. In case when the high range frequency limiting circuit is enabled, by contrast, frequency components equal to, or higher than a cut-off frequency are effectively removed by the frequency limiting circuit.

As an example, by selecting the cut-off frequency to be a little higher than wobble signal frequency, noise components related to the change in track reflectivity can be removed.

As a further example, in case either a recording velocity is relatively low, or a laser power is small, thereby the sample-and-hold circuit being enabled, flat regions of signal waveform of output signals from photoreceptor elements are relatively stable.

As a result, even with a sample-and-hold circuit fabricated using electronic components, mass produced and conventionally available, sample-holding steps can be carried out with a high accuracy. Similarly, even with a high range frequency limiting circuit fabricated with such electronic components as noted above, frequency components equal to, or higher than, the predetermined cut-off frequency can be efficiently removed irrespective of recording conditions.

Accordingly, wobble signals can be detected by the wobble signal detecting circuit disclosed herein with a high accuracy and at lower costs irrespective of recording velocity.

In another aspect of the disclosure, the wobble signal detecting circuit described above can further include a first normalization circuit for normalizing respective amplitudes of the first and second photoelectric signals, from which frequency components equal to, or higher than, the predetermined cut-off frequency are removed previously by the high range frequency limiting circuit.

In still another aspect, the wobble signal detecting circuit can further include a first amplitude adjusting circuit for adjusting respective amplitudes of the first and second photoelectric signals, which is provided preceding the sample-and-hold circuit and the high range frequency limiting circuit.

By means of the first amplitude adjusting circuit, first and second photoelectric signals can be adjusted with a predetermined adjustment rate. In addition, a circuit for determining this adjustment rate can be included further in the wobble signal detecting circuit, in that this adjustment rate can be determined by selecting one from at least two values of gain, which are prepared in advance.

Furthermore, in case when the sample-and-hold circuit is enabled, the circuit for determining adjustment rate determines the adjustment rate such that respective levels of the first and second photoelectric signals are not saturated during sampling steps by the sample-and-hold circuit.

Also, in case when the high range frequency limiting circuit is enabled, the circuit for determining adjustment rate determines the adjustment rate such that respective levels of the first and second photoelectric signals not saturated during sampling steps by the sample-and-hold circuit.

In another aspect, the wobble signal detecting circuit as described above can be operated frequency components, which are related to information recorded into the optical information recording medium, removed from the first and second photoelectric signals.

In addition, the information to be recorded into the optical information recording medium can be subjected to EFM modulation. The frequency of EFM modulation, $f_{EFM}$, is related to the aforementioned cut-off frequency, $f_c$, by an expression, $f_{wbl} \ll f_c \ll f_{EFM}$, where $f_{wbl}$ is the frequency of wobble signals.

In another aspect, the recording conditions related to the wobble signal detecting circuit disclosed herein can include at least one of recording velocity, laser power, and type of optical information recording medium, among others. The above mentioned type of optical recording medium may include recording method, materials, information supplied by manufacturer, and other similar pieces of related information.

In case when recording velocity is selected as one of the recording conditions, the first and second photoelectric signals are respectively subjected to sample-holding steps by the sample-and-hold circuit when the recording velocity is less than a predetermined value, and frequency components equal to, or higher than, the predetermined cut-off frequency are removed from the first and second photoelectric signals by the high range frequency limiting circuit when the recording velocity is equal to, or higher than the predetermined value.

In contrast, in case when laser power is selected as one of the recording conditions, first and second photoelectric signals are respectively subjected to sample-holding steps by the sample-and-hold circuit when the laser power is less than a further predetermined value, and frequency components equal to, or higher than, the predetermined cut-off frequency are removed from the first and second photoelectric signals by the high range limiting circuit when the laser power is equal to, or higher than the predetermined value.

In another aspect, for carrying out readout steps with the wobble signal detecting circuit, a second normalization circuit can be additionally included for normalizing respective amplitudes of first and second photoelectric signals for reading out the information recorded previously in the optical information recording medium.

In addition, a second amplitude adjusting circuit, which is provided preceding the second normalization circuit, can be included further for adjusting respective amplitudes of first and second photoelectric signals. This second amplitude adjusting circuit is configured to adjust the amplitudes of first and second photoelectric signals such that respective levels of resultant signals from the first and second photoelectric signals are not saturated.

The present disclosure also relates to an optical information record/readout system configured to record and readout information by irradiating with a spot of light a plurality of recording regions formed continuously on an optical information recording medium in the shape of spiral or concentric circle, including at least an optical detection unit for receiving light beams reflected from the plurality of recording regions by means of first and second photo-receiving regions of a photoreceptor, which are formed by splitting at least doubly in the tangential direction with respect to the plurality of recording regions, and for outputting a first photoelectric signal from the first photo-receiving region and a second photoelectric signal from the second photo-receiving region; a wobble signal detecting circuit described herein above for detecting wobble signals by detecting wobble signal marks previously formed in the plurality of recording regions based on the first and second photoelectric signals; and a control unit for controlling the position of the spot of light based on the wobble signals detected by the wobble signal detecting circuit.

The wobble signal detecting circuit disclosed herein can detect therefore wobble signals with a high accuracy and at lower costs irrespective of recording velocity based on photoelectric signals from the photo-receiving regions. As a result, highly reliable information recording into an optical recording medium becomes feasible continually with a high accuracy through the range of higher recording velocities.

The present disclosure and features and advantages thereof will be more readily apparent from the following detailed description and appended claims when taken with drawings.

BRIEF DESCRIPTION OF THE DRAWINGS

FIG. 1 is a block diagram illustrating an information record/readout system according to one embodiment disclosed herein;

FIG. 6 contains a flow chart illustrating process steps during recording for setting the wobble signal detecting circuit disclosed herein;

DESCRIPTION OF THE PREFERRED EMBODIMENTS

Figure 2A:
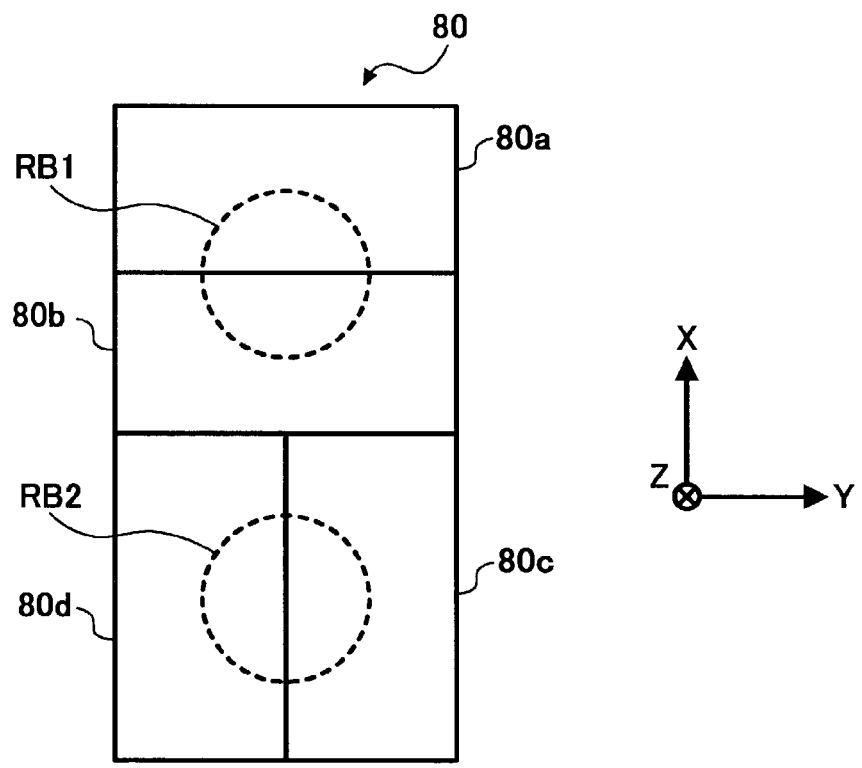
FIG. 2A is a drawing illustrating the photoreceptor elements according to one embodiment disclosed herein.

In the detailed description which follows, specific embodiments of the system and method are described, which are particularly useful for accurate signal detection and recording and reading out information data using optical recording media. It is understood, however, that the present disclosure is not limited to these embodiments. For example, the method of signal detection disclosed herein may also be adaptable to any form of information recording and reading out. Other embodiments will be apparent to those skilled in the art upon reading the following description.

FIG. 1 is a block diagram illustrating an optical disc system 20 as optical information write/readout apparatus according to one embodiment disclosed herein;

Referring to FIG. 1, the optical disc system 20 includes a spindle motor 22 for rotating an optical disc 15 as an optical information recording medium, optical pickup 23, laser control circuit 24, encoder 25, motor driver 27, analogue signal processing circuit 28, ATIP decoder 31, CD decoder 32, servo controller 33, buffer RAM 34, CD-ROM recorder 35, D/A converter 36, buffer manager 37, interface 38, ROM 39, CPU 40, and RAM 41.

In addition, a CD-R is primarily in use as the optical disc 15 in the present embodiment, in which the information data recorded in the disc 15 are subjected to the modulation, EFM (Eight to Fourteen Modulation), as the standards for the CD recording media.

The optical pickup 23 incorporates several components (not shown) such as a semiconductor laser as a light source, optical unit, photoreceptor for receiving light beams reflected from tracks which serve as data recording area, and drive unit (including at least a focusing actuator, tracking actuator, and seek motor).

Light beams emitted from the semiconductor laser are properly collimated and focused on the track portions on the optical disc 15 to form a predetermined spot size. Light beams reflected from the track portions are then led to the photoreceptor through the optical unit.

The photoreceptor is formed as illustrated in FIG. 2A including a quad-split-detector 80 (first, second, third and fourth photoreceptor elements, 80a, 80b, 80c and 80d, respectively).

For the purposes of explanation, a rectangular coordinate shown in FIG. 2A is used herein, in which the y- and x-axes are taken horizontally and vertically, respectively, while the Z-axis is perpendicular to these two axes.

The photoreceptor elements, 80a and 80b, are formed each having the same rectangular shape with its elongated side along the y-axis, while the elements, 80c and 80d, are formed each having the same rectangular shape with its elongated side along the y-axis (FIG. 2A). Second element 80b is located adjacent to, and on the (−x) side of, first element 80a. In addition, fourth element 80d is located adjacent to, and on the (−y) side of, third element 80c (FIG. 2A).

Figure 2B:
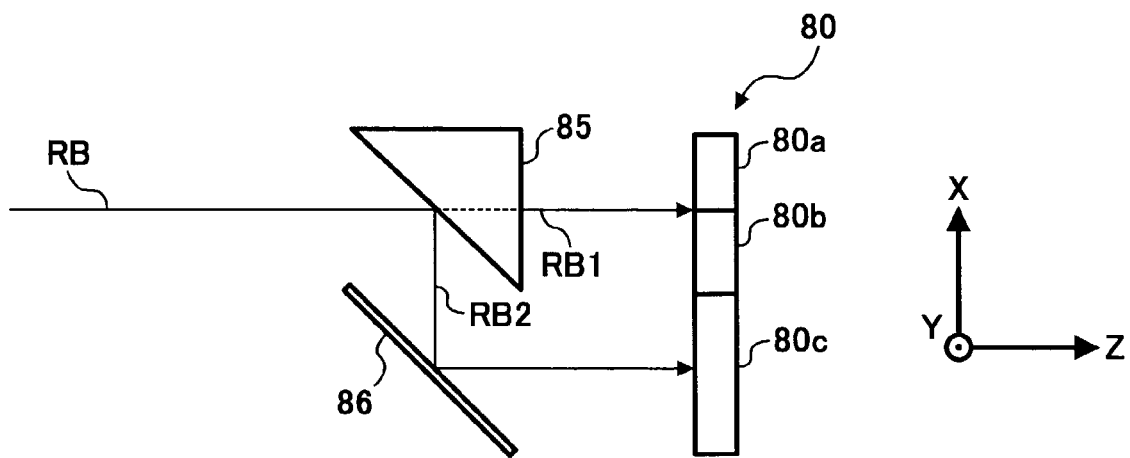
FIG. 2B is a top view illustrating the function of the optical unit including the photoreceptor elements of FIG. 2A according to one embodiment disclosed herein.

As illustrated in FIG. 2B, light beams RB reflected from track portions are split into two directions by a prism 85 included in the optical pickup 23.

The beam RB1, which is led to a first direction by means of, and transmitted through, the prism 85, is then received by the region consisting of first and second photoreceptor elements, 80a and 80b.

On the other hand, the second beam RB2, which is reflected by the surface of the prism 85, led to the (−x) direction, and deflected further to the (+z) direction by a reflecting mirror 86, is then received by the other region consisting of third photoreceptor element 80c (first light receiving region) and fourth photoreceptor element 80d (second light receiving region)(FIG. 2A).

Figure 3A:
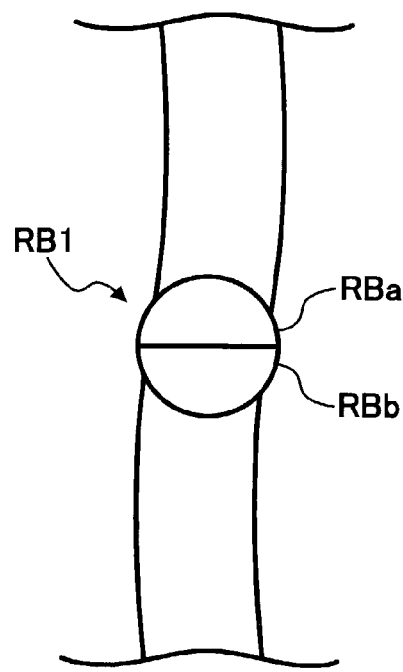
FIGS. 3A and 3B are drawings illustrating the portions of photoreceptor elements of FIG. 2A, irradiated with reflected light beams.
Figure 3B:
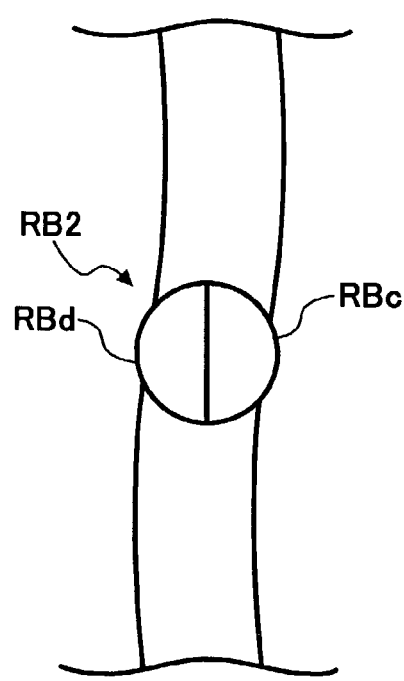
Figure 4:
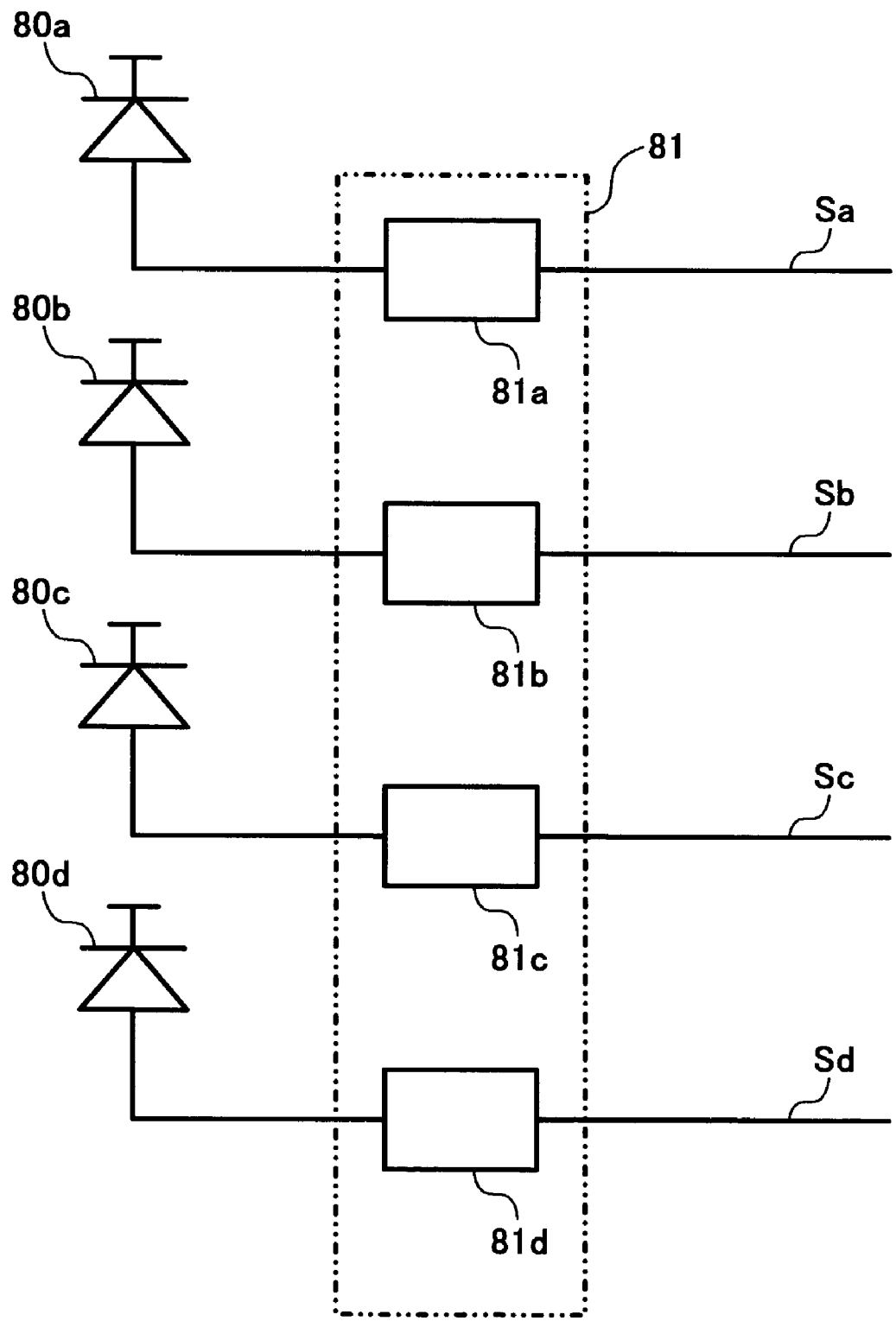
FIG. 4 is a block diagram illustrating the I/V amplifier unit of FIG. 1.

That is, the top half portion, RBa, out of the reflected beam RB1 irradiates first photoreceptor element 80a and the bottom half portion, RBa, irradiates second photoreceptor element 80b (FIG. 3A). In addition, the right-hand half portion, RBc, out of the reflected beam RB2 irradiates the third element 80c and the left-hand half portion, RBd, irradiates the fourth element 80d (FIG. 3B).

In response to the intensity of irradiated light beams, current signals are output from respective photoreceptor elements, 80a, 80b, 80c and 80d, to be fed to analogue signal processing circuit 28.

Although the photoreceptor has been described above with reference to the quad-split-detector 80, the receptor may also be provided with other construction. For example, the receptor may be formed with either a couple of double-split-detector, or four aligned photoreceptor elements. The form and arrangement of the photoreceptor, therefore, are not limited to those indicated herein above in the present disclosure.

Referring again to FIG. 1, the analogue signal processing circuit 28 includes an I/V (current-voltage conversion) amplifier unit 81 for converting the current signals output from the photoreceptor elements, 80a, 80b, 80c and 80d, into voltage signals; wobble signal detecting circuit 30 for extracting wobble signals; RF signal detection circuit 82 for detecting RF signals including information to be readout; and error signal detection circuit 83 for detecting several error signals such as focusing errors and tracking errors.

The I/V amplifier unit 81 is formed as illustrated in FIG. 2A including a first I/V amplifier 81a for converting the current signals output from first photoreceptor element 80a into voltage signals, Sa; second I/V amplifier 81b for converting the current signals output from second photoreceptor element 80b into voltage signals, Sb; third I/V amplifier 81c for converting the current signals output from third photoreceptor element 80c into voltage signals, Sc (first photoelectric signals); and fourth I/V amplifier 81d for converting the current signals output from fourth photoreceptor element 80d into voltage signals, Sd (second photoelectric signals).

The RF signal detection circuit 82 operates to obtain the sums of the signals, Sa and Sb, and SC and Sd, and binarize resultant sums, to subsequently be output as detected RF signals.

The error signal detection circuit 83 operates to compute the differences between signals, Sa and Sb, and binarize the resultant value, whereby focusing error signals are obtained. Similarly, the difference between Sc and Sd signals, is computed and then the resultant values are binarized, whereby tracking error signals are obtained. The detected focusing and tracking errors are then output respectively to servo controller 33.

Figure 5B:
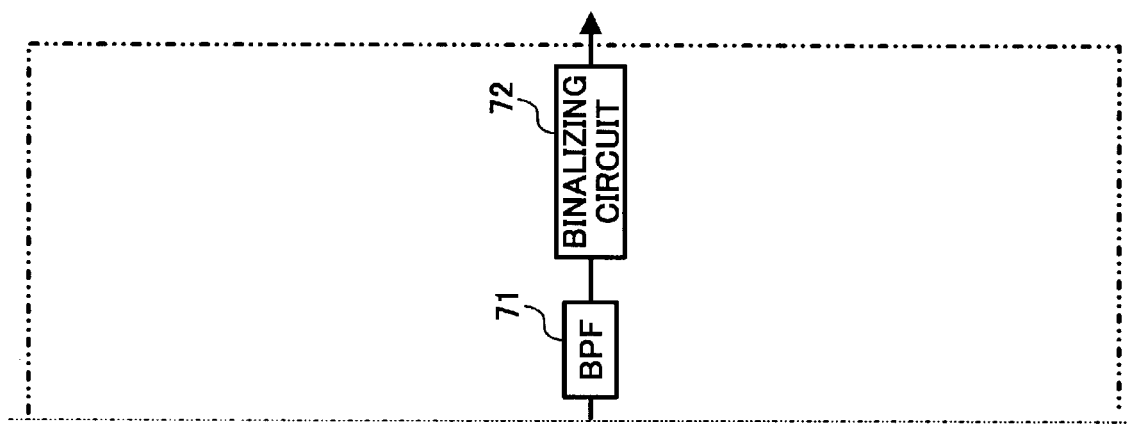
FIG. 5 is a block diagram illustrating construction details of the wobble signal detecting circuit of FIG. 1.

FIG. 5 is an electrical schematic diagram illustrating construction details of the wobble signal detecting circuit according to one embodiment disclosed herein.

Referring to FIG. 5, the wobble signal detecting circuit 30 includes at least a first amplitude adjusting circuit 51a, first sampling circuit 52a, second amplitude adjusting circuit 55a, first low range frequency limiting circuit 56b, first filtering circuit 57a, first normalizing circuit 60a, third amplitude adjusting circuit 51b, second sampling circuit 52b, fourth amplitude adjusting circuit 55b, second low range frequency limiting circuit 56b, second filtering circuit 57b, second normalizing circuit 60b, subtracter 70, frequency range limiting circuit 71, and binarizing circuit 72.

The first amplitude adjusting circuit 51a operates the amplitude of Sc signals adjusted and subsequently output to the first sampling circuit 52a. During the adjustment, at least two values of gain are prepared as adjustment factors to suitably adjust the amplitude and one of the values is selected by the instruction of CPU 40. In the present embodiment, for example, it is designed that one of the two values, G1 and G2 with being G1>G2, is selected by the instruction of CPU 40.

The first amplitude adjusting circuit 51a includes S/H (sample-and-hold) circuit 53a and output signal switching device 54a. Based on the instruction of CPU 40, the output signal switching device 54a selects output signals from first sampling circuit 52a out of the output signals either from S/H circuit 53a or from first amplitude adjusting circuit 51a, to output to second amplitude adjusting circuit 55a.

The S/H circuit 53a operates to sample-and-hold output signals from first amplitude adjusting circuit 51a at a predetermined timing. Namely, by suitably switching output signal switching device 54a, the selection is made whether the sample-holding capability is enabled with respect to output signals from first amplitude adjusting circuit 51a.

The second amplitude adjusting circuit 55a operates the amplitude of output signals from first sampling circuit 52a adjusted and then output to first low range frequency limiting circuit 56a. During the adjustment, at least two values of gain are prepared as adjustment factors to suitably adjust the amplitude and one of the values is selected through the instruction of CPU 40.

It may be added the adjustment at the present step is more precise than the previously one made by the first amplitude adjusting circuit 51a. In addition, it is designed in the present embodiment that one of the two values, G3 and G4 with being G3>G4, is selected by the instruction of CPU 40.

The first low range frequency limiting circuit 56a includes at least a HPF (high-pass filter) capable of removing DC components included in the signals output from second amplitude adjusting circuit 55a and then outputting to first filtering circuit 57a.

The first filtering circuit 57a includes an LPF (low-pass filter) 58a and output signal switching device 59a. Based on the instruction of CPU 40, the output signal switching device 59a selects output signals from first filtering circuit 57a out of the output signals either from LPF 58a or from first low range frequency limiting circuit 56a, to subsequently output to first normalizing circuit 60a.

The LPF 58a operates to remove or filter signal components (referred to as 'EFM signals' hereinafter), which are included in output signals from first low range frequency limiting circuit 56a and related to EFM modulated recorded data.

The LPF 58a is herein designed to have a cutoff frequency specified by the following expression, $$f_{wbl} \ll f_c \ll f_{EFM} \quad (1),$$

where $f_{wbl}$ and $f_{EFM}$ are the frequency of wobble signals and EFM signals, respectively. The cutoff frequency $f_c$ adopted herein is small enough compared with that of EFM signals which are to be removed presently, and large enough compared with that of wobble signals which are to be detected presently.

In the case of decad-nominal (CD 10×) speed, $f_{wbl}$ and $f_{EFM}$ are known approximately 200 kHz and 10 MHz, respectively. The cutoff frequency $f_c$ can therefore be selected to satisfy the expression, $$200 \text{ kHz} \ll f_c \ll 10 \text{ MHz} \quad (2).$$

In addition, since the cutoff frequency $f_c$ is preferably closer to the $f_{wbl}$ frequency rather than the $f_{EFM}$ frequency, the cutoff frequency $f_c$ is chosen 1 MHz for decad-nominal speed.

It is by suitably switching output signal switching device 59a that decides whether the sample-holding capability is enabled with respect to signals output from first low range frequency limiting circuit 56a.

The first normalizing circuit 60a includes VCA (voltage control amplifier) circuit 62a, AGC (automatic gain control) circuit 61a, and output signal switching device 63a. Based on the instruction of CPU 40, the output signal switching device 63a selects output signals from first normalizing circuit 60a out of the output signals either from VCA (voltage control amplifier) circuit 62a or from first filtering circuit 57a, to subsequently output to subtracter 70.

The VCA circuit 62a and AGC circuit 61a operate to implement the normalization of the amplitude of output signals from first filtering circuit 57a. In addition, AGC circuit 61a herein carries out feedback control such that the amplitude of the signals output from VCA circuit has a predetermined level of magnitude.

Namely, by suitably switching output signal switching device 63a, the selection is made whether the normalizing capability is enabled of the signals output from first filtering circuit 57a.

The third amplitude adjusting circuit 51a operates the amplitude of Sd signals adjusted and subsequently output to second sampling circuit 52b. During the adjustment, at least two values of gain are prepared as adjustment factors, in a similar manner to the first amplitude adjusting circuit 51a, to suitably adjust the amplitude, and one of the values is selected through the instruction of CPU 40. In the present embodiment, for example, it is designed that one of the two values, G1 and G2 with being G1>G2, is selected by the instruction of CPU 40.

The second sampling circuit 52b includes S/H circuit 53b and output signal switching device 54b. Based on the instruction of CPU 40, the output signal switching device 54b selects output signals from second sampling circuit 52b out of the output signals either from S/H circuit 53b or from third amplitude adjusting circuit 51b, to output to fourth amplitude adjusting circuit 55b.

The S/H circuit 53b operates to sample-and-hold output signals from third amplitude adjusting circuit 51b at a predetermined timing. Namely, by suitably switching output signal switching device 54b, the selection is made whether the sample-holding capability is enabled with respect to the signals output from third amplitude adjusting circuit 51b.

The fourth amplitude adjusting circuit 55b operates the amplitude of output signals from second sampling circuit 52b adjusted and then output to second low range frequency limiting circuit 56b. During the adjustment, at least two values of gain are prepared as adjustment factors to suitably adjust the amplitude and one of the values is selected by the instruction of CPU 40.

It may be added the adjustment at the present step is more precise than the previously one made by the first amplitude adjusting circuit 51b. In addition, it is designed in the present embodiment that one of the two values, G3 and G4, is selected by the instruction of CPU 40, in a similar manner to the second amplitude adjusting circuit 55a.

The second low range frequency limiting circuit 56b includes at least a HPF, which is capable of removing DC components included in output signals from fourth amplitude adjusting circuit 55b and then outputting to second filtering circuit 57b.

The second filtering circuit 57b includes LPF 58b and output signal switching device 59b. Based on the instruction of CPU 40, the output signal switching device 59b selects output signals from second filtering circuit 57b out of the output signals either from LPF 58*b* or from second low range frequency limiting circuit 56*b*, to subsequently output to second normalizing circuit 60*b*.

The LPF 58*b* is designed in this embodiment to have the same cutoff frequency $f_c$ as that of the above LPF 58*a* and operates to remove EFM signals included in output signals from first low range frequency limiting circuit 56*b*. Namely, by suitably switching output signal switching device 59*b*, the selection is made whether the filtering capability is enabled of output signals from the second low range frequency limiting circuit 56*b*.

It may be added that these first and second filtering circuits, 57*a* and 57*b*, can be fabricated using electronic components which are mass produced and available conventionally.

The second normalizing circuit 60*b* includes VCA circuit 62*b*, AGC circuit 61*b*, and output signal switching device 63*b*. Based on the instruction of CPU 40, the output signal switching device 63*b* selects output signals from second normalizing circuit 60*b* out of the output signals either from VCA circuit 62*b* or from second filtering circuit 57*b*, to subsequently output to subtracter 70.

The AGC circuit 61*b* and VCA circuit 62*b* operate the amplitude of output signals from first filtering circuit 57*b* normalized. In addition, AGC circuit 61*b* herein carries out feedback control such that the amplitude of the signals output from VCA circuit 62*b* has a predetermined level of magnitude.

In addition in the present embodiment, the amplitude is adjusted to be same for output signals from both the VCA circuit 62*a* in first normalizing circuit 60*a* and the VCA circuit 62*b* in second normalizing circuit 60*b*.

By suitably switching output signal switching device 63*b*, therefore, the selection can be made whether the capability of normalizing the amplitude of the signals output from second filtering circuit 57*b* is enabled.

The subtracter 70 operates the difference between the signal outputs from the first and the second normalizing circuits, 60*a* and 60*b*, obtained and subsequently output to frequency range limiting circuit 71.

Since wobble signal components included in the signals output from first normalizing circuit 60*a* are in opposite phase to those included in the signals output from second normalizing circuits 60*b*, there gives rise substantially to the amplification of the wobble signal components.

In addition, since RF signal components included in the signals output from first normalizing circuit 60*a* are in phase with those included in the signals output from second normalizing circuits 60*b*, there gives rise substantially to the decrease in RF signal components.

The frequency range limiting circuit 71 includes at least BPF (band-pass filter), which operates to extract wobble signals from output signals from subtracter 70 and to output to binarizing circuit 72.

The binarizing circuit 72 includes at least a comparator, which operates to binarize output signals from frequency range limiting circuit 71 and to output to ATIP decoder 31 as wobble signals.

Referring again to FIG. 1, ATIP decoder 31 operates to extract absolute time information, synchronization signals and other similar signals, from ATIP information included in the wobble signals. The thus extracted ATIP information is subsequently output to CPU 40, while the synchronization signals are output to encoder 25.

The CD decoder 32 carries out on RF signals detected by RF signal detecting circuit 82, several operations such as EFM demodulation, de-interleaving, and error correction by CIRC (cross interleave Reed Solomon code).

Based on focusing error signals detected by error signal detection circuit 83, the servo controller 33 operates to generate control signals for controlling the focusing actuator included in optical pickup 23 to be subsequently output to motor driver 27.

In addition, based on focusing tracking error signals detected by the error signal detection circuit 83, the servo controller 33 operates to generate control signals for controlling the tracking actuator included in the optical pickup 23 to be also output to motor driver 27.

In the case where the data recorded on optical disc 15 are those of music, the D/A converter 36 converts the output signals from CD decoder 32 to analogue data and then outputs as audio signals to audio equipments, for example.

In contrast, in the case where the data recorded on the optical disc 15 are other than those of music (e.g., image and document data), CD-ROM recorder 35 carries out process steps of error checking and error correction on the data, based on check codes affixed to the data, for the resultant data to be subsequently stored in buffer RAM 34 by way of buffer manager 37.

The buffer manager 37 then operates to monitor the amount of data stored in buffer RAM 34 and to notify to CPU 40 if the amount reaches a predetermined value.

The motor driver 27 directs to drive focusing actuator and tracking actuator included in optical pickup 23, based on control signals from servo controller 33.

The motor driver 27 also controls a spindle motor 22, based on the instruction by CPU 40, such that the optical disc 15 is properly driven either in the CLV (constant linear velocity) mode or in the CAV (constant angular velocity) mode. Furthermore, the motor driver 27 drives a seek motor included in optical pickup 23 so as to properly control the location in the sledge direction (the radial direction) of the optical disc 15.

The encoder 25 carries out several steps on the data stored in buffer RAM 34 such as affixing error correction codes, inter-leave processing, and EFM modulation, so as to form the data to be recorded in the optical disc 15. Subsequently, the encoder 25 outputs the above data to a laser control circuit 24 in synchronous with synchronization signals from ATIP decoder 31 based on the instruction by CPU 40.

The laser control circuit 24 controls the output of a semiconductor laser included in optical pickup.

The interface 38 herein used is one of the two-way communication interfaces between a host computer (e.g., personal computer) in compliance with the standard interface such as ATAPI (AT Attachment Packet Interface) and SCSI (Small computer System Interface).

The CPU 40 directs to control the operation of above mentioned portions of the optical disc apparatus 20 according to the program stored in ROM 39, as well as to store the data necessary for the control temporally in RAM 41.

For the optical disc apparatus 20 with the construction as described above, processing steps for recording data in optical disc 15 will be detailed herein below. In addition, recording velocity is primarily concerned in the following description as one of recording conditions.

Upon receiving a recording request command and data from host computer by way of interface 38, the CPU 40 instructs the data stored in buffer RAM 34 by way of buffer manager 37.

Based on a recording velocity supplied by the host computer, the CPU 40 also instructs control signals for controlling the rotation of the spindle motor 22 be output to motor driver 27. Also output to the motor driver 27 are further signals for directing seek movements of optical pickup 23 to be located properly at the proper predetermined position for initiating data recording.

The buffer manager 37 operates to monitor the amount of data stored in buffer RAM 34 and to notify to CPU 40 if the amount reaches a predetermined value.

Upon notified by buffer manager 37, the CPU 40 directs the wobble signal detecting circuit 30 set to detect wobble signals.

FIG. 6 includes a flowchart illustrating the steps carried out for the setting, which correspond to a series of processing algorithm implemented by CPU 40. Referring to FIG. 6, the setting steps of wobble signal detecting circuit 30 will be described herein below.

At Step 401, an inquiry is made regarding whether a recording velocity is equal to, or larger than, a predetermined threshold value S1 (e.g., octad-nominal speed). If the response to the inquiry is negative, indicating the recording velocity is less than the predetermined threshold value S1, the process proceeds to Step 403.

Selection signals are output at Step 403 to first and third amplitude adjusting circuits, 51a and 51b, for selecting a gain G1. In addition, further selection signals are output to second and fourth frequency adjusting circuits, 55a and 55b, for selecting G3 as a gain. Therefore, a larger gain is selected in respective pairs of the frequency adjusting circuits.

Thereafter, at Step 405, selection signals are output to an output signal switching device 54a for selecting output signals from S/H circuit 53a as those from a first sampling circuit 52a. In addition, further selecting signals are output to the output signal switching device 54b for selecting signals output from S/H circuit 53b as those from a second sampling circuit 52b.

The respective sampling circuits, 52a and 52b, are therefore instructed to select enabling the sample-holding capability.

At Step 407, selection signals are output to output signal switching device 59a for selecting output signals from a first low range frequency limiting circuit 56a as those from a first filtering circuit 57a. In addition, further selection signals are output to another output signal switching device 59b for selecting signals output from second low range frequency limiting circuit 56b as those from second filtering circuit 57b.

The respective filtering circuits, 57a and 57b, are therefore instructed to select disabling the filtering capability.

Selection signals are output at Step 409 to a further output signal switching device 63a for selecting signals output from the first filtering circuit 57a as those from a first normalizing circuit 60a. In addition, further selection signals are output to output signal switching device 63b for selecting signals output from the second filtering circuit 57b as those from a second normalizing circuit 60b.

The respective normalizing circuits, 60a and 60b, are therefore instructed to select disabling the normalizing capability.

In contrast, if the response to the inquiry is affirmative, indicating the recording velocity is equal to, or larger than, the predetermined threshold value S1, the process proceeds to Step 411.

At Step 411, selection signals are output to first and third frequency adjusting circuits, 51a and 51b, for selecting G2 as a gain. In addition, further selecting signals are output to second and fourth frequency adjusting circuits, 55a and 55b, for selecting G4 as a gain. Therefore, a smaller gain is selected in respective pairs of the frequency adjusting circuits.

Thereafter, at Step 413, selection signals are output to the output signal switching device 54a for selecting signals output from the first frequency adjusting circuit 51a as those from the first sampling circuit 52a. In addition, further selection signals are output to the output signal switching device 54b for selecting signals output from the third frequency adjusting circuit 51b as those from the second sampling circuit 52b.

The respective sampling circuits, 52a and 52b, are therefore instructed to select disabling the sample-holding capability.

At Step 415, selection signals are output to the output signal switching device 59a for selecting signals output from an LPF 58a as those from a first filtering circuit 57a. In addition, further selection signals are output to the output signal switching device 59b for selecting signals output from a further LPF 58b as those from the second filtering circuit 57b.

The respective filtering circuits, 57a and 57b, are therefore instructed to select enabling the filtering capability.

Selection signals are output at Step 417 to the output signal switching device 63a for selecting signals output from a VCA 62a as those from the first normalizing circuit 60a. In addition, further selection signals are output to the output signal switching device 63b for selecting signals output from another VCA 62b as those from the second normalizing circuit 60b.

The respective normalizing circuits, 60a and 60b, are therefore instructed to select enabling the normalizing capability.

The wobble signal detecting circuit 30 thus operates wobble signals detected under the above-mentioned predetermined conditions on the basis of signals, Sc and Sd.

Processing steps carried out by the wobble signal detecting circuit 30 will be detailed herein below.

Figure 7A:
FIGS. 7A through 7E each include charts illustrating waveforms in the case of recording velocity of less than the predetermined threshold value S1, comparing laser emission (7A), photoelectric signal output from third photoreceptor element (7B), photoelectric signal output from fourth photoreceptor element (7C), photoelectric signal from third photoreceptor element after amplitude adjusted (7D) and after S/H steps (7E)
Figure 7B:
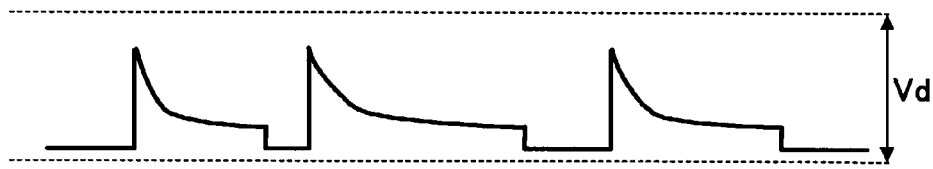
Figure 7C:

The steps are first described for the case of recording velocity of less than the predetermined threshold value S1. In addition, there assumed in the present embodiment are (1) the waveform of laser beams emitted from an optical pickup 23 to be pulse-shaped as illustrated in FIG. 7A, for example, (2) a signal Sc to have a waveform illustrated in FIG. 7B, and (3) a signal Sd to have a further waveform illustrated in FIG. 7C similar to that of the signal Sc with the exception of a different amplitude.

The amplitude of the signal Sc is adjusted with the gain G1 by the first amplitude adjusting circuit 51a. This adjustment is herein carried out, for example, such that the signal level (i.e., the level of the flat portions of the signal waveform) does not exceed a maximum range, Vd, at the point of time when the succeeding S/H circuit 53a exercises sampling steps, that is, the level is not saturated.

Figure 7D:
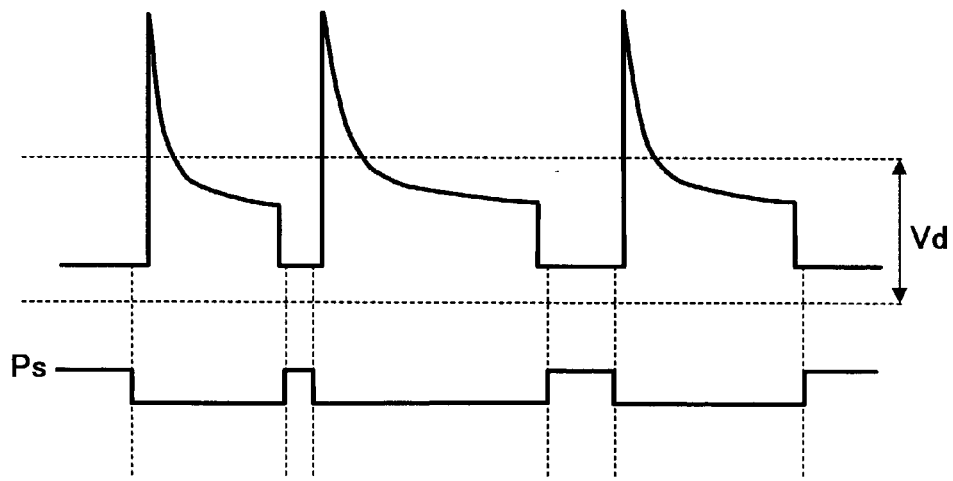

Incidentally, it may be added as shown in FIG. 7D that the signal level may exceed the maximum range at other points of time when the succeeding S/H circuit 53a does not exercise sampling steps.

Output signals from first frequency adjusting circuit 51a are then subjected to sample-holding steps by S/H circuit 53a in first sampling circuit 52a. Namely, as shown in FIG. 7D, the sampling starts at the time corresponding to leading edge of a sampling pulse PS, and then holds the signal level reached at the time corresponding to trailing edge of the pulse.

Figure 7E:
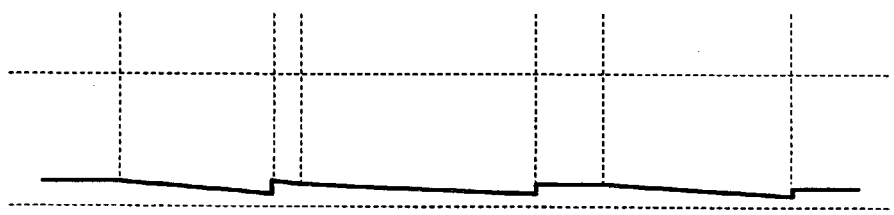

Therefore, the signals output from the S/H circuit 53*a* are obtained as shown in FIG. 7E, having waveforms in which the components related recorded marks are eliminated.

The amplitude of the signals output from the first sampling circuit 52*a* (or from the S/H circuit 53*a*) is adjusted with the gain G3 by the second frequency adjusting circuit 55*a*.

DC components included in output signals from second amplitude adjusting circuit 55*a* are removed by first low range frequency limiting circuit 56*a*. Output signals from the first low range frequency limiting circuit 56*a* are led to one of input terminals of subtracter 70 without any signal processing by either first filtering circuit 57*a* or first normalizing circuit 60*a*.

On the other hand, the amplitude of the signal Sd is adjusted by third frequency adjusting circuit 51*b* with the same gain G1 as the first frequency adjusting circuit 51*a*.

Output signals from third frequency adjusting circuit 51*b* are then subjected to sample-holding steps by S/H circuit 53*b* in second sampling circuit 52*b*.

Therefore, the signals output from the S/H circuit 53*b* are obtained, having waveforms in which the components realted recorded marks are removed in a similar manner to the signal Sd.

The amplitude of the signals output from second sampling circuit 52*b* (or from the S/H circuit 53*b*) is adjusted by fourth frequency adjusting circuit 55*b* with the same gain G3 as the second frequency adjusting circuit 55*a*.

DC components included in output signals from fourth frequency adjusting circuit 55*b* are removed b y second low range frequency limiting circuit 56*b*. Output signals from the second low range frequency limiting circuit 56*b* are led to the other input terminal of subtracter 70 without any signal processing by either second filtering circuit 57*b* or second normalizing circuit 60*b*.

Although the amplitude of the output signals from first normalizing circuit 60*a* (which is the same as those from first low range frequency limiting circuit 56*a*, in this case) is not necessarily equal to that of those from second normalizing circuit 60*b* (which is the same as those from first low range frequency limiting circuit 56*b*), it may be noted herein that noise components, which may adversely affect to wobble signals, are already removed.

Figure 8A:
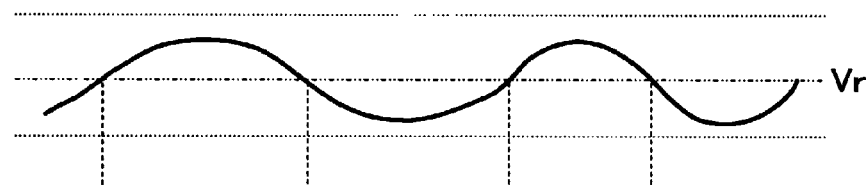
FIG. 8 includes charts illustrating waveforms comparing extracted wobble signal components (A) and binarized wobble signals (B)

Furthermore, the difference in output signals between those from first normalizing circuit 60*a* and from second normalizing circuit 60*b* is obtained by subtracter 70, from which wobble signal components are extracted by frequency range limiting circuit 71 as illustrated in FIG. 8A in an exaggerated fashion.

In addition, since the frequency is considerably smaller for wobble signals than FM signals, it should be noted that the scale for the horizontal axis (time axis) of FIG. 8A is shown for purposes of explanation considerably expanded compared with that of FIGS. 7A through 7E.

Figure 8B:

The wobble signal components are then compared with a voltage (FIG. 8A) having a predetermined level of magnitude such as Vr, for example, to be subsequently binarized as shown in FIG. 8B. The thus binarized signal components are output as wobble signals to ATIP decoder 31.

There described herein above has been on the case of recording velocity of less than the predetermined threshold value S1.

Next, on the case of recording velocity of equal to, or larger than, a predetermined threshold value S1, the steps carried out by wobble signal detecting circuit 30 will be detailed.

Figure 9A:
FIGS. 9A through 9E each include charts illustrating waveforms in the case of recording velocity of equal to, or greater than, the predetermined threshold value S1, comparing laser emission (9A), photoelectric signal output from the third photoreceptor element (9B), photoelectric signal output from the fourth photoreceptor element (9C), photoelectric signal from the third photoreceptor element after amplitude adjusted (9D) and after the removal of EFM signal components (9E)
Figure 9B:
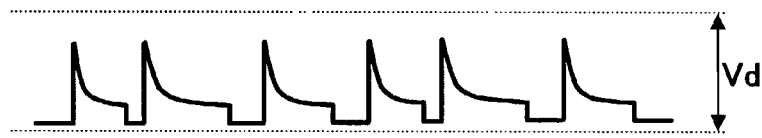
Figure 9C:
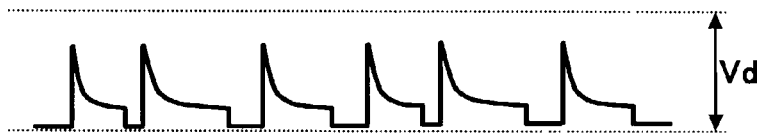

There assumed in the present embodiment are (1) the waveform of laser beams emitted from an optical pickup 23 to be pulse-shaped as illustrated in FIG. 9A, for example, (2) a signal Sc to have a waveform illustrated in FIG. 9B, and (3) a signal Sd to have a further waveform illustrated in FIG. 9C, similar to that of the signal Sc with the exception of a different amplitude.

The amplitude of the signal Sc is adjusted with the gain G2 by the first amplitude adjusting circuit 51*a*. Thereafter, without any further processing by first sampling circuit 52*a*, the adjusted signal Sc is led to second amplitude adjusting circuit 55*a* where a further amplitude adjustment is carried out with gain G4.

Figure 9D:

In the present embodiment, suitable values are set for the gains, G2 and G4, such that the level of signal output from the second amplitude adjusting circuit 55*a* is not saturated, as shown in FIG. 9D, for example.

DC components included in output signals from second amplitude adjusting circuit 55*a* are removed by first low range frequency limiting circuit 56*a*.

Furthermore, signal components, which are included in output signals from first low range frequency limiting circuit 56*a* with the frequency higher than the cutoff frequency $f_c$, are removed by LPF 58*a* included in first filtering circuit 57*a*.

Figure 9E:
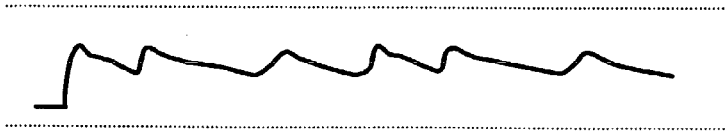

As a result, smoothing steps are made on EFM signal components included in output signals from the first low range frequency limiting circuit 56*a*, whereby the waveform is formed as illustrated in FIG. 9E. Namely, noise components can thus be reduced.

The amplitude is normalized for the signals output from first filtering circuit 57*a* (or from LPF 58*a*) by AGC 61*a* and VCA 62*a* included in first normalizing circuit 60*a*. The resultant signals are subsequently input to one of input terminals of subtracter 70.

On the other hand, the amplitude of the signal Sd is adjusted with the gain G3 by the third amplitude adjusting circuit 51*b*. Thereafter, without any further processing by second sampling circuit 52*b*, the adjusted signal Sd is led to fourth amplitude adjusting circuit 55*b* where a further amplitude adjustment is carried out with gain G4.

DC components included in output signals from fourth amplitude adjusting circuit 55*b* are removed by second low range frequency limiting circuit 56*b*.

Signal components, which are included in output signals from second low range frequency limiting circuit 56*b* with the frequency higher than the cutoff frequency $f_c$, are removed by LPF 58*b* included in second filtering circuit 57*b*.

As a result, smoothing steps are made on EFM signal components included in output signals from the second low range frequency limiting circuit 56*b*, whereby the waveform is formed as illustrated in FIG. 9E. Namely, noise components can thus be reduced.

The amplitude is normalized for the signals output from second filtering circuit 57*b* (or from LPF 58*b*) by AGC 61*b* and VCA 62*b* included in second normalizing circuit 60*b*. The resultant signals are subsequently input to the other input terminal of subtracter 70.

Namely, the same amplitude is obtained for output signals from first normalizing circuit 60*a* (i.e., from VCA 62*a*) and from second normalizing circuit 60*b* (i.e., from VCA 62*b*).

Furthermore, the difference in output signals between those from first normalizing circuit 60*a* and from second normalizing circuit 60*b* is obtained by subtracter 70. In the present case, the signal components in the same phase can be removed for signals output from the first normalizing circuit 60*a* and the second normalizing circuit 60*b*.

Subsequently, wobble signal components are extracted by frequency range limiting circuit 71. The wobble signal components are then binarized by binarizing circuit 72, to be output as wobble signals to ATIP decoder 31.

The ATIP decoder 31 operates to extract ATIP information based on the wobble signals obtained as above by the wobble signal detecting circuit 30.

If any error in the ATIP information is found by means of, for example, error codes affixed to the ATIP information, this is informed to CPU 40 as a detected ATIP information error. The CPM 40 instructs several measures such as computing error rate of the ATIP information, halting recording steps when the rate exceeds a predetermined value, and notifying to the host computer.

Upon receiving the absolute time information included in the ATIP information from ATIP decoder 31, the CPU 40 instructs to determine whether the time corresponds to the proper predetermined location for initiating data recording.

The encoder 25 carries out several steps on the data output from buffer RAM 34 by way of buffer manager 37. These steps include affixing error correction codes, inter-leave processing, EFM modulation, and forming recording data.

If it is determined by CPU 40 based on the absolute time information that the optical pickup 23 is properly placed at the predetermined location for initiating data recording, this is informed to encoder 25.

The encoder 25 then carries out recording steps on recording data stored on recording tracks on the optical disc 15 by means of laser control circuit 24 and optical pickup 23. In addition, the encoder operates laser control circuit 24 and optical pickup 23 driven in synchronous with the rotation of spindle motor 22 based on synchronization signals from ATIP decoder 31.

For the optical disc apparatus 20 with the construction as described above, processing steps for reading out recorded data from optical disc 15 will be detailed herein below.

Upon receiving a readout request command from the host computer, the CPU 40, based on a present readout velocity, instructs control signals for controlling the rotation of the spindle motor 22 be output to motor driver 27. Also output to the motor driver 27 are further signals for directing seek movements of optical pickup 23 to be placed properly at the predetermined location for initiating data recording.

Figure 10:
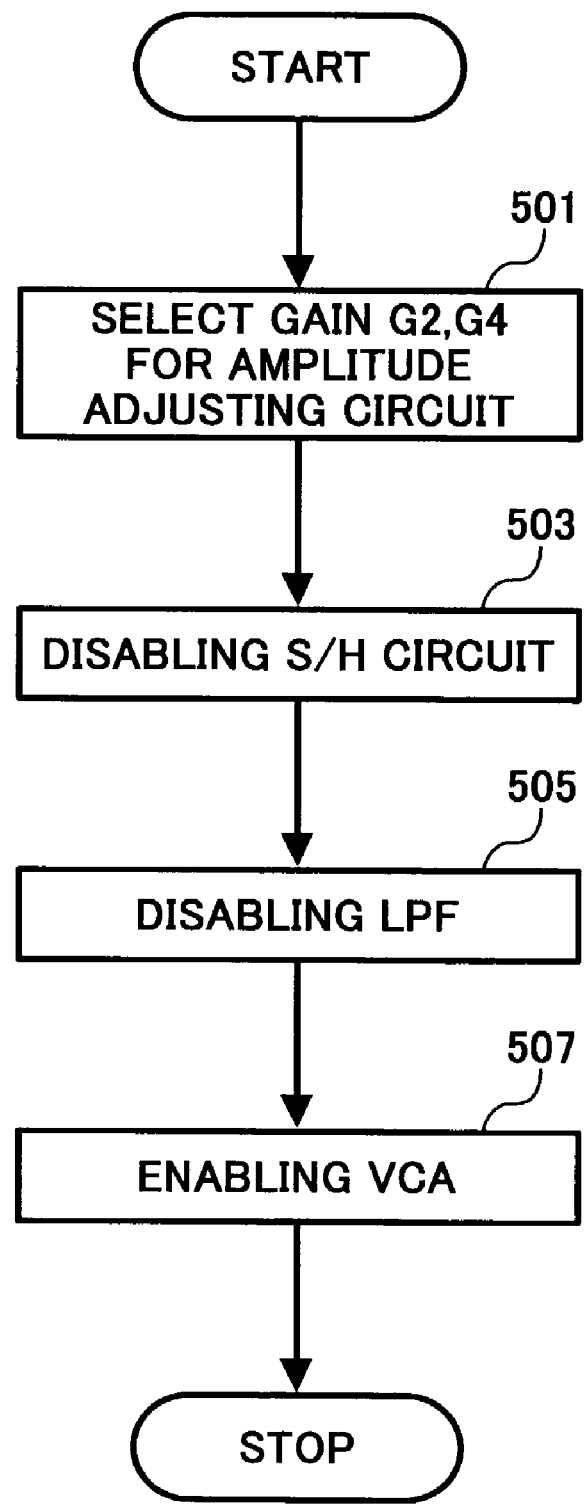
FIG. 10 contains a flow chart illustrating process steps during readout for setting the wobble signal detecting circuit disclosed herein.

In addition, the CPU 40 instructs wobble signal detecting circuit 30 set to detect wobble signals. FIG. 10 includes a flowchart illustrating the steps carried out for the setting, which correspond to a series of processing algorithm implemented by CPU 40. Referring to FIG. 10, the setting steps of wobble signal detecting circuit 30 will be described herein below.

At Step 501, selection signals are output to first and third amplitude adjusting circuits, 51*a* and 51*b*, for selecting G2 as a gain. In addition, further selection signals are output to second and fourth frequency adjusting circuits, 55*a* and 55*b*, for selecting a gain G4. Therefore, a smaller gain is selected in respective pairs of the frequency adjusting circuits.

Thereafter, at Step 503, selection signals are output to the output signal switching device 54*a* for selecting output signals from first amplitude adjusting circuit 51*a* as those from first sampling circuit 52*a*. In addition, further selection signals are output to the output signal switching device 54*b* for selecting output signals from third amplitude adjusting circuit 51*b* as those from second sampling circuit 52*b*.

The respective sampling circuits, 52*a* and 52*b*, are therefore instructed to select disabling the sample-holding capability.

At Step 505, selection signals are output to output signal switching device 59*a* for selecting output signals from first low range frequency limiting circuit 56*a* as those from a first filtering circuit 57*a*. In addition, further selection signals are output to another output signal switching device 59*b* for selecting output signals from second low range frequency limiting circuit 56*b* as those from second filtering circuit 57*b*.

The respective filtering circuits, 57*a* and 57*b*, are therefore instructed to select disabling the filtering capability.

Selection signals are output at Step 507 to output signal switching device 63*a* for selecting output signals from VCA 62*a* as those from first normalizing circuit 60*a*. In addition, further selection signals are output to the output signal switching device 63*b* for selecting output signals from VCA 62*b* as those from second normalizing circuit 60*b*.

The respective normalizing circuits, 60*a* and 60*b*, are therefore instructed to select enabling the normalizing capability.

The wobble signal detecting circuit 30 thus operates wobble signals detected under the above-mentioned predetermined conditions on the basis of signals, Sc and Sd.

Processing steps carried out by the wobble signal detecting circuit 30 will be described briefly herein below.

Figure 11A:
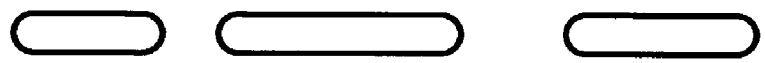
FIGS. 11A through 11D each include charts illustrating several waveforms resulted from a sequence of recorded marks (A), comparing photoelectric signal output from third photoreceptor element (11B), photoelectric signal output from fourth photoreceptor element (11C), and photoelectric signal from third photoreceptor element after amplitude adjusted (11D).

It is assumed in the present embodiment that track portions of an optical disc 15 are previously recorded with data having a waveform as illustrated in FIG. 11A.

Figure 11B:
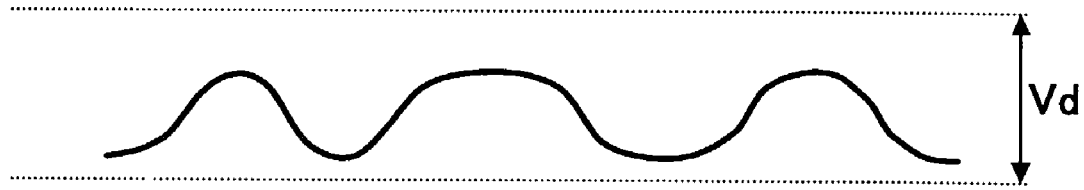
Figure 11C:
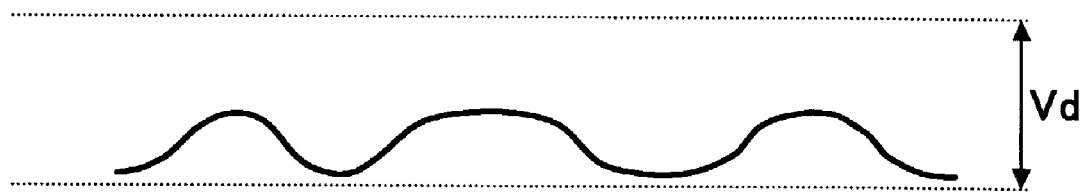

Also assumed herein are (1) a signal Sc has a waveform illustrated in FIG. 11B and (2) a signal Sd has a further waveform illustrated in FIG. 11C similar to that of the signal Sc with the exception of a different amplitude.

The amplitude of the signal Sc is adjusted with the gain G1 by first amplitude adjusting circuit 51*a*. Thereafter, resultant output signals are fed through first sampling circuit 52*a* without any processing, and further led to second amplitude adjusting circuit 55*b* where an amplitude adjustment is made with a gain G4.

Figure 11D:
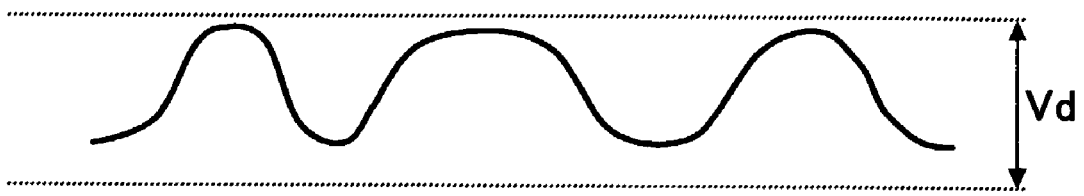

This adjustment is carried out with properly selected values of gains, G2 and G4, such that the level of magnitude of the output signals from the second amplitude adjusting circuit 55*b* does not saturate as shown in FIG. 11D.

DC components included in output signals from second amplitude adjusting circuit 55*a* are removed by first low range frequency limiting circuit 56*a*.

Output signals from the first low range frequency limiting circuit 56*a* are fed through first filtering circuit 57*a* without any processing and further led to first normalizing circuit 60*a* where the amplitude of the signals is normalized by AGC 61*a* and VCA 62*a*. The resultant signals are then input to one of input terminals of subtracter 70.

On the other hand, the amplitude of the signal Sd is adjusted with the gain G2 by the third amplitude adjusting circuit 51*b*. Thereafter, without any further processing by second sampling circuit 52*b*, the adjusted signal Sd is led to fourth amplitude adjusting circuit 55*b* where a further amplitude adjustment is carried out with gain G4.

DC components included in output signals from fourth amplitude adjusting circuit 55*b* are removed by second low range frequency limiting circuit 56*b*.

Output signals from the second low range frequency limiting circuit 56*b* are fed through second filtering circuit 57*b* without any processing, and further led to second normalizing circuit 60*b* where the amplitude of the signals is normalized by AGC 61*b* and VCA 62*b*. The resultant signals are then input to the other input terminal of the subtracter 70.

Namely, the same amplitude is obtained for output signals from first normalizing circuit 60a (i.e., from VCA 62a) and from second normalizing circuit 60b (i.e., from VCA 62b).

Furthermore, the difference in output signals between those from first normalizing circuit 60a and from second normalizing circuit 60b. Thereafter, wobble signal components are amplified, and output signals are provided from subtracter 70 after removing RF components.

The wobble signal components are extracted by frequency range limiting circuit 71 and then the components are binarized by binarizing circuit 72, to be output as wobble signals to ATIP decoder 31.

The ATIP decoder 31 operates to extract ATIP information based on the wobble signals obtained as above by the wobble signal detecting circuit 30.

In addition, the CPM 40 instructs several measures such as computing error rate of ATIP information, halting recording steps when the rate exceeds a predetermined value, and notifying to the host computer.

Upon receiving the absolute time information included in the ATIP information from ATIP decoder 31, the CPU 40 instructs to determine whether the time corresponds to the proper predetermined location for initiating data recording.

If it is determined by CPU 40 based on the absolute time information that the optical pickup 23 is properly placed at the proper predetermined location for initiating data recording, this is informed to RF signal detection circuit 82. RF signals are then detected by the RF signal detecting circuit 82. In addition, several operations such as EFM demodulation, error correction, de-interleaving and others are carried out by CD decoder 32.

In the case where the data recorded on optical disc 15 are those of music, output signals from CD decoder 32 are converted to analogue data by D/A converter 36 and then outputs as audio signals to audio equipments, for example.

In contrast, in the case where the data recorded on the optical disc 15 are other than those of music, output signals from CD decoder 32 are subjected to error checking and error correction, and then stored in buffer RAM 34 by way of buffer manager 37.

The buffer manager 37 then operates the data stored in the buffer RAM 34 monitored and the data transferred to the host computer by way of interface 38 if the data are recognized as sector data.

As detailed herein above regarding the present disclosure, the wobble signal detecting unit included in the optical disc system 20 comprises wobble signal detecting circuit 30 and CPU 40.

In addition, the sampling means is provided with S/H circuits, 53a and 53b, and high range frequency limiting means with LPF's, 58a and 58b. The first amplitude adjusting means is provided with first and third amplitude adjusting circuits, 51a and 51b, and second amplitude adjusting means with first and second amplitude adjusting circuits, 51a and 55a, and with third and fourth amplitude adjusting circuits, 51b and 55b.

Furthermore, the adjustment rate determining means is provided with CPU 40, and the first normalizing means is provided with VCA 62a and AGC 61a, and the second normalizing means with VCA 62b and AGC 61b.

Also, in the optical disc system 20 disclosed herein an optical detection means is provided with third and fourth photoreceptor elements, 80c and 80d, and a control means thereof is provided with the CPU 40.

As described earlier, wobble signal detecting circuit 30 disclosed herein is configured to properly implement information recording in the optical disc 15.

In the case where the recording velocity is equal to, or larger than, the predetermined threshold value S1, the wobble signal detecting circuit 30 is instructed by CPU 40 to disable the sample-holding capability of sampling circuits, 52a and 52b, and to enable the filtering capability of filtering circuits, 57a and 57b, with respect to the output signals, Sc and Sd, from photoreceptor elements.

As a result, signal components which are included in the output signals, Sc and Sd, with the frequency higher than the cutoff frequency $f_c$, are removed, to thereby noise components due to reflectivity change can suitably be reduced.

By contrast, in the case where the recording velocity is less than the predetermined threshold value S1, the circuit 30 is instructed to enable the sample-holding capability of sampling circuits, 52a and 52b, and to disable the filtering capability of filtering circuits, 57a and 57b, with respect to the output signals, Sc and Sd, from photoreceptor elements.

Since flat regions of signal waveform of output signals from photoreceptor elements, Sc and Sd, are relatively stable, it becomes feasible signal levels during the space period determined with a high accuracy.

In addition, since sample-and-hold steps are carried out only for relatively low recording velocities, S/H circuits, 53a and 53b, respectively included in sampling circuits, 52a and 52b, can be fabricated using electronic components which are mass produced and available conventionally.

As a result, wobble signals can be detected with a high accuracy and at lower costs than the previous case where sample-holding steps are carried out irrespective of recording velocity.

According to the present embodiment, since the signals filtered by filtering circuits, 57a and 57b, are subsequently normalized by normalizing circuits, 60a and 60b, noise components can be reduced efficiently by subtracter 70. Therefore, the wobble signals can be detected with a higher accuracy.

In addition, the amplitude of output signals, Sc and Sd, from photoreceptor elements is adjusted so as not saturated by amplitude adjusting circuits, 51a and 51b, prior to sample-holding steps, according to the present embodiment. As a result, it becomes feasible wobble signals amplified selectively.

Since the amplitude of output signals, Sc and Sd, from photoreceptor elements is adjusted also in the present embodiment so as not saturated by amplitude adjusting circuits, 51a and 51b, prior to filtering by filtering circuits, 57a and 57b, signal components having the frequency higher than the cutoff frequency can suitably be removed by filtering circuits, 57a and 57b.

Furthermore, since the amplitude of output signals, Sc and Sd, from photoreceptor elements is adjusted by amplitude adjusting circuits, 51a and 51b, with gain values described earlier, the accuracy of the adjustment can be increased with relative ease. Furthermore, since one gain value is selectively adopted by CPU 40b between two values previously prepared, to be used for adjusting the amplitude of output signals, Sc and Sd, from photoreceptor elements, optimum adjustment can be achieved even after taking into account succeeding steps.

In addition, since the filtering circuits, 57a and 57b, are respectively designed to have cutoff frequency large enough compared with that of wobble signals and small enough compared with the EFM signals, EFM signal components can be removed effectively by filtering circuits, 57a and 57b. As a result, wobble signals can be detected with a high accuracy.

Still in addition, in the case of reading out information data from the optical disc 15 through the instruction of CPU 40, sampling circuits, 52*a* and 52*b*, are designed to disable the sample-holding capability, and succeeding normalizing circuits, 60*a* and 60*b*, are designed to enable the normalization capability. This makes signal amplitudes to become the approximately same level of magnitude for RF signal components at two input terminals of subtracter 70. As a result, RF signal components can effectively be removed, to thereby be able detect wobble signals with a high accuracy.

Also for reading out information data from the optical disc 15 through the instruction of CPU 40 in the present embodiment, the amplitude of output signals, Sc and Sd, from photoreceptor elements is adjusted so as not saturated by amplitude adjusting circuits, 51*a* and 51*b*, prior to amplitude normalization steps by normalizing circuits, 60*a* and 60*b*. As a result, RF signal components can effectively be removed with a higher accuracy.

Furthermore, for implementing information recording in the optical disc 15 in the optical disc system 20 according to the present disclosure, it becomes feasible by the wobble signal detecting circuit 30 disclosed herein to detect wobble signals with a high accuracy irrespective of recording velocity.

As a result, highly reliable information recording becomes continually feasible with excellent stability even in the range of higher recording velocities.

While the present disclosure has been described with reference primarily to recording velocity as one of the recording conditions, it is not intended to limit the disclosure. For example, the power of laser emission for writing recorded marks (which is hereinafter referred to as power of LD emission or "LD power") may also be used as another condition.

With reference to LD power, an inquiry is made by CPU 40 regarding whether a present LD power is equal to, or larger than, a predetermined threshold value S2.

If the response to the inquiry is affirmative, indicating the LD power is equal to, or larger than, the predetermined threshold value S2, the CPU 40 operates the wobble signal detecting circuit 30 implemented by the similar setting steps to those described earlier in the case of recording velocity of equal to, or larger than, the predetermined value S1.

In contrast, if the response to the inquiry is negative, indicating the LD power is less than the predetermined value S2, the CPU 40 operates the wobble signal detecting circuit 30 implemented by the similar setting steps to those in the case of recording velocity of less than the predetermined value S1. These steps are taken since noise components increase with increasing LD power. It is added that these threshold values, S1 and S2, may arbitrarily be set as well as varied.

Some other parameter may also be used as a further recording condition such as the type of optical disc, or more specifically recording method therefor (e.g., CD-R or CD-RW) and disc information supplied by disc manufacturer. The disc information is provided in general by recorded in the read-in region as a part of ATIP information on recording track portions of optical disc 15 preceding zero absolute time information.

With respect to the disc type, the distinction may be made between CD-R and CD-RW from the difference in the intensity of reflected light beams. Namely, the reflectivity is at least 60% for the former, while from 15 to 25% for the latter. From the reflectivity value and ATIP information, therefore, it is feasible to distinguish the type of optical disc.

Alternatively the recording conditions are utilized not only individually, as descried above, but also in combination among conditions such as recording velocity, LD power, and the type of the disc.

In addition, while the present disclosure has been described with reference to CD-R as the optical disc 15, it is not intended to be limiting. For example, the process steps disclosed herein may also be applied to rewritable optical discs as well as other optical information recording medium as long as disc information is provided with the form of wobble signals.

Still in addition, while the process steps disclosed herein have been described primarily on extracting ATIP information from wobble signals, information such as ADIP (Address in Pre-grooved) may also be extracted from the wobble signals.

Furthermore, while data to be recorded have been described to be subjected to the EF modulation in the present disclosure, this is not intended to be limiting.

In addition, while the amplitude of output signals from photoreceptor elements has been adjusted by amplitude adjusting circuits, 51*a*, 51*b*, 55*a* and 55*b*, with one gain value selectively adopted by CPU 40*b* between two values previously prepared, other gain values may also be used. For example, the case of three gain values prepared in advance may also be considered from which one gain value may be selected by CPU 40*b*, or an arbitrary gain value is newly set in place of a plurality of gain values prepared in advance.

Furthermore, while the gain for first and third amplitude adjusting circuits, 51*a* and 51*b*, has been described to be same in the present embodiment, different values of the gain may also be adapted to the respective amplitude adjusting circuits.

Similarly, different values of the gain may be adapted to the respective amplitude adjusting circuits, 55*a* and 55*b*.

While the selection of enabling or disabling the sample-holding capability of sampling circuits, 52*a* and 52*b*, is made in the present embodiment by CPU 40 through switching the first and second output signal switching devices, 54*a* and 54*b*, this is not intended to be limiting.

For example, the selection may alternatively be carried out by first notifying recording conditions to the sampling circuits, 52*a* and 52*b*, and then the sampling circuits can select the gain value.

Alternatively, switching devices may additionally be provided as a preceding stage to the S/H circuits, 53*a* and 53*b*, for selecting whether output signals from the preceding circuit are input to the circuits, 53*a* and 53*b*, in place of the output signal switching devices, 54*a* and 54*b*.

Still alternatively, the S/H circuits, 53*a* and 53*b*, may be formed to selectively be switched on or off the sample-holding capability depending on either the instruction by CPU 40 or recording conditions.

The structure and capability noted above for S/H circuits, 53*a* and 53*b*, may also be applied to filtering circuits, 57*a* and 57*b*, and normalizing circuits, 60*a* and 60*b*, as well.

The optical disc system 20 disclosed herein may be provided with a host computer into a single console, or so-called as a built-in system, or alternatively, be provided separated from the host computer as a peripheral unit.

It is apparent from the above description including the examples the wobble signal detecting circuit operates either sample-holding means or high range frequency limiting means enabled depending on the recording conditions. As a result, wobble signals can be detected with a high accuracy and at lower costs irrespective of recording velocity.

In addition, by means of the optical information record/readout system disclosed herein, wobble signals can be detected during processing steps of information recording into optical information recording medium with a high accuracy irrespective of recording conditions. As a result, highly reliable information recording becomes continually feasible with excellent stability even in the range of higher recording velocities.

The process steps set forth in the present description on the wobble signal detecting circuit may be implemented using conventional general purpose microprocessors, programmed according to the teachings in the present specification, as will be appreciated to those skilled in the relevant arts. Appropriate software coding can readily be prepared by skilled programmers based on the teachings of the present disclosure, as will also be apparent to those skilled in the relevant arts.

The present specification thus include also a computer-based product which may be hosted on a storage medium, and include instructions which can be used to program a microprocessor to perform a process in accordance with the present disclosure. This storage medium can include, but not limited to, any type of disc including floppy discs, optical discs, CD-ROMs, magneto-optical discs, ROMs, RAMs, EPROMs, EEPROMs, flash memory, magnetic or optical cards, or any type of media suitable for storing electronic instructions.

Additional modifications and variations of the present invention are possible in light of the above teachings. It is therefore to be understood that within the scope of the appended claims, the invention may be practiced other than as specifically described herein.

This document claims priority and contains subject matter related to Japanese Patent Application No. 2001-294598, filed with the Japanese Patent Office on Sep. 26, 2001, the entire contents of which are hereby incorporated by reference.

What is claimed as new and desired to be secured by Letters Patent of the United States is:

1. A wobble signal detecting circuit comprising:
   a sample-and-hold circuit configured to implement sample-holding steps on each of a first photoelectric signal and a second photoelectric signal;
   a high range frequency limiting circuit configured to remove frequency components equal to, or higher than, a predetermined cut-off frequency from said first photoelectric signal and said second photoelectric signal; and
   a normalization circuit configured to normalize respective amplitudes of said first photoelectric signal and said second photoelectric signal, from which said frequency components equal to, or higher than, a predetermined cut-off frequency are removed previously by said high range frequency limiting circuit,
   wherein said sample-and-hold circuit and said high range frequency limiting circuit are each selectively enabled to select an appropriate gain to be applied to said first photoelectric signal and said second photoelectric signal depending on at least one recording condition during a period of recording information into an optical information recording medium.

2. A wobble signal detecting circuit comprising:
   a sample-and-hold circuit configured to implement sample-holding steps on each of a first photoelectric signal and a second photoelectric signal;
   a high range frequency limiting circuit configured to remove frequency components equal to, or higher than, a predetermined cut-off frequency from said first photoelectric signal and said second photoelectric signal;
   a first amplitude adjusting circuit coupled to said sample-and-hold circuit and said high range frequency limiting circuit, wherein said first amplitude adjusting circuit adjusts respective amplitudes of said first photoelectric signal and said second photoelectric signal; and
   a circuit coupled to the first amplitude adjusting circuit, configured to determine said adjustment rate,
   wherein said sample-and-hold circuit and said high range frequency limiting circuit are each selectively enabled to select an appropriate gain to be applied to said first photoelectric signal and said second photoelectric signal depending on at least one recording condition during a period of recording information into an optical information recording medium, and
   wherein said first amplitude adjusting circuit adjusts respective amplitudes of said first photoelectric signal and said second photoelectric signal with a predetermined adjustment rate, and, wherein said circuit, configured to determine said adjustment rate, determines said adjustment rate such that respective levels of said first photoelectric signal and said second photoelectric signal are not saturated during sampling steps initiated by said sample-and-hold circuit during operation.

3. A wobble signal detecting circuit comprising:
   a sample-and-hold circuit configured to implement sample-holding steps on each of a first photoelectric signal and a second photoelectric signal;
   a high range frequency limiting circuit configured to remove frequency components equal to, or higher than, a predetermined cut-off frequency from said first photoelectric signal and said second photoelectric signal;
   a first amplitude adjusting circuit coupled to said sample-and-hold circuit and said high range frequency limiting circuit, wherein said first amplitude adjusting circuit adjusts respective amplitudes of said first photoelectric signal and said second photoelectric signal; and
   a circuit coupled to the first amplitude adjusting circuit, configured to determine said adjustment rate,
   wherein said sample-and-hold circuit and said high range frequency limiting circuit are each selectively enabled to select an appropriate gain to be applied to said first photoelectric signal and said second photoelectric signal depending on at least one recording condition during a period of recording information into an optical information recording medium, and
   wherein said first amplitude adjusting circuit adjusts respective amplitudes of said first photoelectric signal and said second photoelectric signal with a predetermined adjustment rate, and, wherein said circuit for determining said adjustment rate determines said adjustment rate such that respective levels of said first photoelectric signal and said second photoelectric signal are not saturated during sampling steps initiated by said sample-and-hold circuit during operation of the high-range frequency limiting circuit.

4. A wobble signal detecting circuit comprising:
   a sample-and-hold circuit configured to implement sample-holding steps on each of a first photoelectric signal and a second photoelectric signal; and
   a high range frequency limiting circuit configured to remove frequency components equal to, or higher than, a predetermined cut-off frequency from said first photoelectric signal and said second photoelectric signal,
   wherein said sample-and-hold circuit and said high range frequency limiting circuit are each selectively enabled to select an appropriate gain to be applied to said first photoelectric signal and said second photoelectric signal depending on at least one recording condition during a period of recording information into an optical information recording medium, wherein said high range frequency limiting circuit is configured to remove frequency components related to information to be recorded in said optical information recording medium from said first photoelectric signal and said second photoelectric signal, wherein said high range frequency limiting circuit is further configured to subject said information to be recorded in said optical information recording medium to EFM modulation, and wherein a cut-off frequency of said high range frequency limiting circuit, $f_c$, satisfies an expression, $f_{wbl} << f_c << f_{EFM}$, where $f_{wbl}$ and $f_{EFM}$ are frequencies of said wobble signals and said information subjected to EFM modulation, respectively.

5. A wobble signal detecting circuit comprising:
a sample-and-hold circuit configured to implement sample-holding steps on each of a first photoelectric signal and a second photoelectric signal; and
a high range frequency limiting circuit configured to remove frequency components equal to, or higher than, a predetermined cut-off frequency from said first photoelectric signal and said second photoelectric signal,
wherein said sample-and-hold circuit and said high range frequency limiting circuit are each selectively enabled to select an appropriate gain to be applied to said first photoelectric signal and said second photoelectric signal depending on at least one recording condition during a period of recording information into an optical information recording medium,
wherein said at least one recording condition includes at least one of recording velocity, laser power, and type of said optical information recording medium, and
wherein:
said first photoelectric signal and said second photoelectric signal are respectively subjected to sample-holding steps by said sample-and-hold circuit when said recording velocity is selected as one of said recording conditions, and
when said recording velocity is less than a predetermined value, and wherein frequency components equal to, or higher than, said predetermined cut-off frequency are removed from said first photoelectric signal and said second photoelectric signal by said high range frequency limiting circuit when said recording velocity is equal to, or higher than said predetermined value.

6. A wobble signal detecting circuit comprising:
a sample-and-hold circuit configured to implement sample-holding steps on each of a first photoelectric signal and a second photoelectric signal; and
a high range frequency limiting circuit configured to remove frequency components equal to, or higher than, a predetermined cut-off frequency from said first photoelectric signal and said second photoelectric signal,
wherein said sample-and-hold circuit and said high range frequency limiting circuit are each selectively enabled to select an appropriate gain to be applied to said first photoelectric signal and said second photoelectric signal depending on at least one recording condition during a period of recording information into an optical information recording medium, wherein said at least one recording condition includes at least one of recording velocity, laser power, and type of said optical information recording medium, and
wherein:
said first photoelectric signal and said second photoelectric signal are respectively subjected to sample-holding steps by said sample-and-hold circuit when said laser power is selected as one of said recording conditions, and
when said laser power is less than a further predetermined value, and frequency components equal to, or higher than, said predetermined cut-off frequency are removed from said first photoelectric signal and said second photoelectric signal by said high range frequency limiting circuit
when said laser power is equal to, or higher than said further predetermined value.

7. A wobble signal detecting circuit comprising:
a sample-and-hold circuit configured to implement sample-holding steps on each of a first photoelectric signal and a second photoelectric signal;
a high range frequency limiting circuit configured to remove frequency components equal to, or higher than, a predetermined cut-off frequency from said first photoelectric signal and said second photoelectric signal;
a first amplitude adjusting circuit coupled to said sample-and-hold circuit and said high range frequency limiting circuit, wherein said first amplitude adjusting circuit adjusts respective amplitudes of said first photoelectric signal and said second photoelectric signal; and
a normalization circuit configured to normalize respective amplitudes of said first photoelectric signal and said second photoelectric signal when information recorded previously is read out from said optical information recording medium,
wherein said sample-and-hold circuit and said high range frequency limiting circuit are each selectively enabled to select an appropriate gain to be applied to said first photoelectric signal and said second photoelectric signal depending on at least one recording condition during a period of recording information into an optical information recording medium.

8. The wobble signal detecting circuit according to claim 7, further comprising:
a second amplitude adjusting circuit coupled to said second normalization circuit configured to adjust respective amplitudes of said first photoelectric signal and said second photoelectric signal.

9. The wobble signal detecting circuit according to claim 8, wherein said second amplitude adjusting circuit adjusts amplitudes of said first photoelectric signal and said second photoelectric signal such that respective levels of resultant signals from said first photoelectric signal and said second photoelectric signal are not saturated.

10. A wobble signal detecting circuit comprising:
sample-and-hold means for implementing sample-holding steps on each of a first photoelectric signal and a second photoelectric signal;
high range frequency limiting means for removing frequency components equal to, or higher than, a predetermined cut-off frequency from said first photoelectric signal and said second photoelectric signal; and
first normalization means for normalizing respective amplitudes of said first photoelectric signal and said second photoelectric signal, from which said frequency components equal to, or higher than, a predetermined cut-off frequency are removed previously by said high range frequency limiting means, wherein said sample-and-hold means and said high range frequency limiting means are each selectively enabled to select an appropriate gain to be applied to said first photoelectric signal and said second photoelectric signal depending on recording conditions during a period of recording information into said optical information recording medium.

11. A wobble signal detecting circuit comprising:

sample-and-hold means for implementing sample-holding steps on each of a first photoelectric signal and a second photoelectric signal;

high range frequency limiting means for removing frequency components equal to, or higher than, a predetermined cut-off frequency from said first photoelectric signal and said second photoelectric signal;

a first amplitude adjusting means for adjusting respective amplitudes of said first photoelectric signal and said second photoelectric signal, coupled to said sample-and-hold means and said high range frequency limiting means; and means for determining said adjustment rate, wherein said sample-and-hold means and said high range frequency limiting means are each selectively enabled to select an appropriate gain to be applied to said first photoelectric signal and said second photoelectric signal depending on recording conditions during a period of recording information into said optical information recording medium, wherein said first amplitude adjusting means adjusts respective amplitudes of said first photoelectric signal and said second photoelectric signal with a predetermined adjustment rate, and wherein, when said sample-and-hold means is enabled, said means for determining said adjustment rate determines said adjustment rate such that respective levels of said first photoelectric signal and said second photoelectric signal are not saturated during sampling steps by said sample-and-hold means.

12. A wobble signal detecting circuit comprising:

sample-and-hold means for implementing sample-holding steps on each of a first photoelectric signal and a second photoelectric signal;

high range frequency limiting means for removing frequency components equal to, or higher than, a predetermined cut-off frequency from said first photoelectric signal and said second photoelectric signal;

a first amplitude adjusting means for adjusting respective amplitudes of said first photoelectric signal and said second photoelectric signal, coupled to said sample-and-hold means and said high range frequency limiting means; and means for determining said adjustment rate, wherein said sample-and-hold means and said high range frequency limiting means are each selectively enabled to select an appropriate gain to be applied to said first photoelectric signal and said second photoelectric signal depending on recording conditions during a period of recording information into said optical information recording medium, wherein said first amplitude adjusting means adjusts respective amplitudes of said first photoelectric signal and said second photoelectric signal with a predetermined adjustment rate, and wherein, when said high range frequency limiting means is enabled, said means for determining said adjustment rate determines said adjustment rate such that respective levels of said first photoelectric signal and said second photoelectric signal are not saturated during sampling steps by said sample-and-hold means.

13. A wobble signal detecting circuit comprising:

sample-and-hold means for implementing sample-holding steps on each of a first photoelectric signal and a second photoelectric signal; and high range frequency limiting means for removing frequency components equal to, or higher than, a predetermined cut-off frequency from said first photoelectric signal and said second photoelectric signal, wherein said high range frequency limiting means is configured to remove frequency components related to information to be recorded in said optical information recording medium from said first photoelectric signal and said second photoelectric signal, wherein said high range frequency limiting means is further configured to subject said information to be recorded in said optical information recording medium to EFM modulation, and wherein a cut-off frequency of said high range frequency limiting means, $f_c$, satisfies an expression, $f_{wbl} \ll f_c \ll f_{EFM}$, where $f_{wbl}$ and $f_{EFM}$ are frequencies of said wobble signals and said information subjected to EFM modulation, respectively.

14. A wobble signal detecting circuit comprising:

sample-and-hold means for implementing sample-holding steps on each of a first photoelectric signal and a second photoelectric signal; and high range frequency limiting means for removing frequency components equal to, or higher than, a predetermined cut-off frequency from said first photoelectric signal and said second photoelectric signal, wherein said sample-and-hold means and said high range frequency limiting means are each selectively enabled to select an appropriate gain to be applied to said first photoelectric signal and said second photoelectric signal depending on recording conditions during a period of recording information into said optical information recording medium, wherein said recording conditions include at least one of recording velocity, laser power, and type of said optical information recording medium, and wherein, in case when said recording velocity is selected as one of said recording conditions, said first photoelectric signal and said second photoelectric signal are respectively subjected to sample-holding steps by said sample-and-hold means when said recording velocity is less than a predetermined value, and frequency components equal to, or higher than, said predetermined cut-off frequency are removed from said first photoelectric signal and said second photoelectric signal by said high range frequency limiting means when said recording velocity is equal to, or higher than said predetermined value.

15. A wobble signal detecting circuit comprising:

sample-and-hold means for implementing sample-holding steps on each of a first photoelectric signal and a second photoelectric signal; and high range frequency limiting means for removing frequency components equal to, or higher than, a predetermined cut-off frequency from said first photoelectric signal and said second photoelectric signal, wherein said sample-and-hold means and said high range frequency limiting means are each selectively enabled to select an appropriate gain to be applied to said first photoelectric signal and said second photoelectric signal depending on recording conditions during a period of recording information into said optical information recording medium, wherein said recording conditions include at least one of recording velocity, laser power, and type of said optical information recording medium, and wherein, when said laser power is selected as one of said recording conditions, said first photoelectric signal and said second photoelectric signal are respectively subjected to sample-holding steps by said sample-and-hold means when said laser power is less than a further predetermined value, and frequency components equal to, or higher than, said predetermined cut-off frequency are removed from said first photoelectric signal and said second photoelectric signal by said high range frequency limiting means when said laser power is equal to, or higher than said further predetermined value.

16. A wobble signal detecting circuit comprising:

sample-and-hold means for implementing sample-holding steps on each of a first photoelectric signal and a second photoelectric signal;

high range frequency limiting means for removing frequency components equal to, or higher than, a predetermined cut-off frequency from said first photoelectric signal and said second photoelectric signal;

a first amplitude adjusting means for adjusting respective amplitudes of said first photoelectric signal and said second photoelectric signal, coupled to said sample-and-hold means and said high range frequency limiting means; and a normalization means for normalizing respective amplitudes of said first photoelectric signal and said second photoelectric signal when information recorded previously is in said optical information recording medium, wherein said sample-and-hold means and said high range frequency limiting means are each selectively enabled to select an appropriate gain to be applied to said first photoelectric signal and said second photoelectric signal depending on recording conditions during a period of recording information into said optical information recording medium.

17. The wobble signal detecting means according to claim 16, further comprising:

a second amplitude adjusting means, coupled to said second normalization means, for adjusting respective amplitudes of said first photoelectric signal and said second photoelectric signal.

18. The wobble signal detecting means according to claim 17, wherein said second amplitude adjusting means adjusts amplitudes of said first photoelectric signal and said second photoelectric signal such that respective levels of resultant signals from said first photoelectric signal and said second photoelectric signal are not saturated.

* * * * *